United States Patent
Inagaki et al.

(10) Patent No.: US 7,969,648 B2
(45) Date of Patent: Jun. 28, 2011

(54) GAIN AND SIGNAL LEVEL ADJUSTMENTS OF CASCADED OPTICAL AMPLIFIERS

(75) Inventors: Shinya Inagaki, Kawasaki (JP); Norifumi Shukunami, Sapporo (JP); Susumu Kinoshita, Kawasaki (JP); Hiroyuki Itou, Sapporo (JP); Taiki Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/406,281

(22) Filed: Apr. 19, 2006

(65) Prior Publication Data

US 2006/0198017 A1 Sep. 7, 2006

Related U.S. Application Data

(62) Division of application No. 10/414,237, filed on Apr. 16, 2003, now Pat. No. 7,061,666, which is a division of application No. 09/264,902, filed on Mar. 9, 1999, now Pat. No. 6,603,596.

(30) Foreign Application Priority Data

Mar. 19, 1998 (JP) .................................. 10-070251
Sep. 11, 1998 (JP) .................................. 10-258114

(51) Int. Cl.
  *H01S 3/00* (2006.01)
(52) U.S. Cl. .............. 359/337.1; 359/337.4; 359/341.41
(58) Field of Classification Search ................ 359/337.1, 359/337.4, 341.41, 337.41
  See application file for complete search history.

(56) References Cited

U.S. PATENT DOCUMENTS

| | | |
|---|---|---|
| 1,871,649 A | 8/1932 | Ball |
| 3,557,347 A | 1/1971 | Robertson ............... 235/150.53 |
| 3,825,336 A | 7/1974 | Reynolds |
| 4,176,908 A | 12/1979 | Wagner |
| 4,292,512 A | 9/1981 | Miller et al. |
| 4,364,639 A | 12/1982 | Sinclair et al. |

(Continued)

FOREIGN PATENT DOCUMENTS

CN 1176529 3/1998

(Continued)

OTHER PUBLICATIONS

S. Kinoshita et al., "Wide-Dynamic-Rang WDM Optical Fiber Amplifiers for 32 × 10 Gb/s, SMF Transmission Systems" OAA '98, Jul. 27-29, Vail, Colorado.

(Continued)

*Primary Examiner* — Mark Hellner
(74) *Attorney, Agent, or Firm* — Staas & Halsey LLP

(57) ABSTRACT

An optical amplification device which includes first and second optical amplifiers, and a controller. The first optical amplifier receives a light and amplifies the received light. The second optical amplifier receives the light amplified by the first optical amplifier, and amplifies the received light. When a level of the light received by the first optical amplifier changes by Δ, the controller controls a level of the light received by the second optical amplifier to change by approximately −Δ. In various embodiments, the controller causes the sum of the gains of the first and second optical amplifiers to be constant. In other embodiments, the optical amplification device includes first and second optical amplifier and a gain adjustor. The gain adjustor detects a deviation in gain of the first optical amplifier from a target gain, and adjusts the gain of the second optical amplifier to compensate for the detected deviation.

29 Claims, 18 Drawing Sheets

U.S. PATENT DOCUMENTS

| | | | |
|---|---|---|---|
| 4,644,145 A | 2/1987 | Gundner | 359/141 |
| 5,050,949 A | 9/1991 | DiGiovanni et al. | |
| 5,083,874 A | 1/1992 | Aida et al. | |
| 5,140,456 A | 8/1992 | Huber | |
| 5,177,634 A | 1/1993 | Way | |
| 5,185,826 A | 2/1993 | Delavaux | |
| 5,218,608 A | 6/1993 | Aoki | |
| 5,225,922 A | 7/1993 | Chraplyvy et al. | |
| 5,239,607 A | 8/1993 | da Silva et al. | |
| 5,253,104 A | 10/1993 | Delavaux | 359/341 |
| 5,260,823 A | 11/1993 | Payne et al. | |
| 5,280,383 A | 1/1994 | Federici et al. | |
| 5,287,216 A | 2/1994 | Chirravuri et al. | |
| 5,361,319 A | 11/1994 | Antos et al. | |
| 5,406,404 A | 4/1995 | DiGiovanni et al. | |
| 5,430,572 A | 7/1995 | DiGiovanni et al. | |
| 5,436,760 A | 7/1995 | Nakabayashi | |
| 5,448,582 A | 9/1995 | Lawandy | 372/42 |
| 5,457,811 A | 10/1995 | Lemson | 455/67.1 |
| 5,497,264 A | 3/1996 | Bayart et al. | |
| 5,502,589 A | 3/1996 | Yamamoto | 398/180 |
| 5,504,609 A | 4/1996 | Alexander et al. | |
| 5,506,724 A | 4/1996 | Shimizu et al. | |
| 5,510,926 A | 4/1996 | Bayart et al. | |
| 5,521,753 A | 5/1996 | Fake et al. | |
| 5,532,870 A | 7/1996 | Shigematsu et al. | |
| 5,537,244 A | 7/1996 | Fukushima et al. | |
| 5,539,563 A | 7/1996 | Park | |
| 5,541,766 A | 7/1996 | Mizrahi et al. | |
| 5,563,731 A | 10/1996 | Asahi | 359/341.41 |
| 5,568,310 A | 10/1996 | Naito | 359/341.1 |
| 5,664,131 A | 9/1997 | Sugiya | |
| 5,673,142 A | 9/1997 | Fatehi et al. | |
| 5,675,432 A | 10/1997 | Kosaka | |
| 5,745,276 A | 4/1998 | Ho et al. | 359/189 |
| 5,764,404 A | 6/1998 | Yamane et al. | |
| 5,801,858 A | 9/1998 | Roberts et al. | 359/114 |
| 5,808,789 A | 9/1998 | Edagawa et al. | |
| 5,812,710 A | 9/1998 | Sugaya | |
| 5,818,629 A | 10/1998 | Kinoshita | |
| 5,867,300 A | 2/1999 | Onaka et al. | 359/283 |
| 5,900,782 A | 5/1999 | Igarashi et al. | 330/254 |
| 5,909,305 A | 6/1999 | Kinoshita | |
| 5,966,237 A | 10/1999 | Sugaya et al. | 359/341 |
| 5,995,274 A | 11/1999 | Sugaya et al. | 359/337 |
| 6,023,366 A | 2/2000 | Kinoshita | |
| 6,025,947 A * | 2/2000 | Sugaya et al. | 398/97 |
| 6,055,092 A * | 4/2000 | Sugaya et al. | 359/337 |
| 6,094,296 A | 7/2000 | Kosaka | 359/341 |
| 6,118,576 A | 9/2000 | Sugiya et al. | |
| 6,144,485 A | 11/2000 | Sugaya et al. | 359/337 |
| 6,157,481 A | 12/2000 | Sugaya et al. | 359/337 |
| 6,198,572 B1 | 3/2001 | Sugaya et al. | 359/337 |
| 6,288,836 B1 | 9/2001 | Kawasaki et al. | |
| 6,313,706 B1 | 11/2001 | Kakuta et al. | 330/302 |
| 6,369,938 B1 | 4/2002 | Sugaya et al. | 359/341.42 |
| 6,388,527 B1 | 5/2002 | Kakuta et al. | 330/295 |
| 6,400,499 B2 | 6/2002 | Sugaya et al. | 359/341.42 |
| 6,421,169 B1 | 7/2002 | Bonnedal et al. | |
| 6,476,679 B2 | 11/2002 | Kakuta et al. | 330/302 |
| 6,480,329 B2 | 11/2002 | Sugaya et al. | |
| 6,483,632 B1 * | 11/2002 | Jolley et al. | 359/337.4 |
| 6,483,633 B2 | 11/2002 | Onishi et al. | |
| 6,501,335 B2 | 12/2002 | Kakuta et al. | 330/302 |
| 6,603,596 B2 | 8/2003 | Inagaki et al. | 359/341.4 |
| 7,061,666 B2 | 6/2006 | Inagaki et al. | |
| 7,224,517 B2 | 5/2007 | Sugaya et al. | |
| 7,474,459 B2 | 1/2009 | Sugaya et al. | |
| 2001/0043121 A1 | 11/2001 | Kakuta et al. | 330/302 |
| 2001/0052821 A1 | 12/2001 | Kakuta et al. | 330/302 |
| 2002/0005761 A1 | 1/2002 | Kakuta et al. | 330/302 |

FOREIGN PATENT DOCUMENTS

| | | |
|---|---|---|
| DE | 19716878 | 11/1997 |
| EP | 0 463 771 A2 | 1/1992 |
| EP | 0 439 867 B1 | 6/1994 |
| EP | 0 695 050 A1 | 1/1996 |
| EP | 0805571 | 11/1997 |
| EP | 0920122 | 6/1999 |
| EP | 1120871 | 8/2001 |
| FR | 2747808 | 4/1997 |
| GB | 2 244 595 | 12/1991 |
| GB | 2312575 | 10/1997 |
| GB | 2 314 714 | 1/1998 |
| JP | 3-44206 | 2/1991 |
| JP | 3-206427 | 9/1991 |
| JP | 4-3028 | 1/1992 |
| JP | 4-3029 | 1/1992 |
| JP | 4-96287 | 3/1992 |
| JP | 4-149525 | 5/1992 |
| JP | 4-275530 | 10/1992 |
| JP | 4-356984 | 12/1992 |
| JP | 5-48207 | 2/1993 |
| JP | 5-63259 | 3/1993 |
| JP | 5-107573 | 4/1993 |
| JP | 5-241209 | 9/1993 |
| JP | 5-291676 | 11/1993 |
| JP | 6-112567 | 4/1994 |
| JP | 7-154338 | 6/1995 |
| JP | 7-202306 | 8/1995 |
| JP | 7-212315 | 8/1995 |
| JP | 7-281219 | 10/1995 |
| JP | 8-110535 | 4/1996 |
| JP | 8-246455 | 9/1996 |
| JP | 8-248455 | 9/1996 |
| JP | 9-159526 | 6/1997 |
| JP | 9-211507 | 8/1997 |
| JP | 9-246879 | 9/1997 |
| JP | 9-289348 | 11/1997 |
| JP | 9-289424 | 11/1997 |
| JP | 9-321701 | 12/1997 |
| JP | 10-065650 | 3/1998 |
| JP | 10-144984 | 5/1998 |
| JP | 11-122192 | 4/1999 |
| JP | 11-220336 | 8/1999 |
| JP | 11-233866 | 8/1999 |
| JP | 2001-168427 | 6/2001 |
| WO | WO 95/26061 | 9/1995 |

OTHER PUBLICATIONS

Y. Sun, et al., "Transmission of 32-WDM 10-Gb/s Channels Over 640 km Using Broad-Band, Gain-Flattened Erbium-Doped Silica Fiber Amplifiers" IEEE Photonics Technology Letters, vol. 9, No. 12, Dec. 1997.

S. Kinoshita et al., "Wide-Dynamic-Range WDM Optical Fiber Amplifiers for 32 × 10 Gb/s, SMF Transmission Systems" OAA '98, Jul. 27-29, Vail, Colorado.

Y. Sun, et al., "Transmission of 32-WDM 10-Gb/s Channels Over 640 km Using Broad-Band, Gain-Flattened Erbium-Doped Silica Fiber Amplifiers" IEEE Photonics Technology Letters, vol. 9, No. 12, Dec. 1997.

Sugaya, Y., et al., "Novel configuration for low-noise and wide-dynamic-range ER-doped fiber amplifier for WDM systems," Optical Amplifiers and Their Applications, Jun. 15-17, 1995, Davos, Switzerland, 1995 Technical Digest Series, vol. 18, pp. 158-161.

Sugaya, Y., et al., "Experimental Investigation for the Designing of EDFA in WDM Transmission System," (with EnglishTranslation) Proceedings of the 1995 IEICE General Conference, Mar. 27-30, 1995.

Sugaya, Y., et al., "Configuration Design of Multi-wavelength Er-doped Fiber Amplifier for WDM Transmission System," (with EnglishTranslation) The Institute of Electronics, Information and Communication Engineers, Technical Report of IEICE, OCS95-36 (Jul. 1995), pp. 21-27.

Patent Abstracts of Japan, Publication No. 10065650, vol. 1998, No. 08, Jun. 30, 1998.

Jolley et al., "Out-of-Band Electronic Gain Clamping For A Variable Gain and Output Power EDFA with Low Dynamic Gain", OFC '97 Technical Digest, Feb. 16, 1997, pp. 134-135.

Pan et al., 22$^{nd}$ European Conference on optical communication, ECOC, pp. 273-276.

"FiberGain™ Module, Single and Double-Dumped Gain Modules for Optical Amplifiers Operating at 1525-1560nm, Preliminary Information", Corning Incorporated, P1731, pp. 1-12, issued May 1994 and indicates that it supersedes an issue of Jan. 1994.

Yamada, M. et al, "Gain Characteristics of $Pr^{3+}$doped Fluoride Fiber Amplifier", Transactions of the Institute of Electronics, Information and Communication Engineers, C-1, vol. J77C-1, No. 1, pp. 17-26, Jan. 1994.

Bassini, R. et al., "A Hybrid Low-noise, Charge Sensitive Amplifier with Fast Discharge Mechanism", 2001 IEEE Nuclear Science Symposium Conference Record, vol. 2, pp. 1014-1017, 2002.

Goosen, K. et al., "Micromechanical Gain Slope Compensator for Spectrally Linear Optical Power Equalization", IEEE Photonics Technology Letters, vol. 12, No. 7, pp. 831-833, Jul. 2000.

Gerlas van den Hoven, Alternative Amplifiers, ThJ3, Optical Fiber Communication Conference, 2004, OFC 2004, Publication Date Feb. 23-27, 2004.

Masuda, H. et al., "Ultra-wide-band hybrid tellurite/silica fiber Raman amplifier", OFC Postconference Technical Digest, vol. 1, pp. 338-390, OFC 2002.

IEEE Colloquium on "Multi-Octave Active and Passive Components and Antennas", Professional Groups E12, IEEE May 10, 1989, Digest No. 1989/75, and including J. B. B: Walker, "A Comparision of Two Multi-Octave 3DB Quadrature Couplers", 6 pages; I. D. Robertson et al., "Novel Techniques for Multi-Octave GaAs MMIC Receivers", 5 pages; H. Cuckson, "Multi-Octave Mixers & Hybrid Couplers for Wide Band Monopulse Direction Finding Receivers", 13 pages; B. J. Minnis, "Designing Distributed Amplifiers for Prescribed Gain Slope", 5 pages; Geen et al, "Broadband GaAs MMICs", 6 pages; C. S. Aitchison et al, "A Miniature 0.5-8 Ghz 1 Watt Hybrid Distributed Power Amplifier for Phased Array Applications", 5 pages; N. Watson et al, "Video Breakthrough From Microwave Switches", 11 pages; J.C. Clifton, "A Design Approach for Broadband Varactor-Tuned Oscillators", 6 pages; K. T. Adams et al, Multi-Octave Fet Voltage Controlled Oscillators, 6 pages; P.E. Foster, "Wideband Antennas for ESM", 4 pages; P. Newham, "A Wideband Polyrod-Fed Hybrid Mode Horn", 6 pages; S. Uysal, "Microstrip Channelling Filters Using -3 dB Directional Couplers",4 pages; M. J. Thornton, "Ultra-Broadband Frequency Discriminator Designs for IFM Receivers", 4 pages.

Block, M.M. et al., "High Energy predictions for pp and pp elastic scattering and total cross sections", Proc. Second International Conference on Elastic and Diffractive Scattering, Elastic and Diffractive Scattering 2, pp. 85-106, 1988.

Cheng, F.Y. "Generalized optimal active control algorithm for seismic-resistant structures with active and hybrid control", International Journal of Computer Applications in Technology, vol. 13, No. 1/2, 2000, pp. 42-51.

Young, R., Alternate amplifier technologies, CED, vol. 15, No. 7, pp. 124-126, Jun. 1989.

Desurvire, "Erbium-Doped Fiber Amplifiers, Principles and Applications", John Wiley & Sons, Preface and pp. 1-770, 1994.

Sugaya, et al., "Configuration Design of Multi-wavelength Er-doped Fiber Amplifier for WDM Transmission System", The Institute of Electronics, Information and Communication Engineers, Technical Report of IEICE, OCS95-36 (Jul. 1995), pp. 21-26 (with English translation).

K. Ogata, "Modern Control Engineering", Prentice-Hall Inc. 1970, pp. 4-6.

John J. D'Azzo, et al., "Feedback Control System Analysis & Synthesis", Second Edition, International Student Edition, McGraw Hill Kogakusha, Ltd., pp. 528-531 (not dated).

S. Kinoshita, et al., "Low-Noise and Wide Dynamic-Range Erbium-Doped Fiber Amplifiers with Automatic Level Control for WDM Transmission Systems", OSA Tops on Optical Amplifiers and Their Applications, vol. 5, 1996 OAA Program Committee (eds.) pp. 49-51.

C. Koester, et al., "Amplification in a Fiber Laser", Applied Optics, vol. 3, No. 10, pp. 1182-1186, Oct. 1964.

M. A. Karr, et al., "Output Power Stability of GaAlAs Laser Transmitters Using an Optical Tap for Feedback Control," Applied Optics, vol. 18, No. 8, pp. 1262-1265, Apr. 15, 1979.

K. Inoue, et al., "Tunable Gain Equalization Using a Mach-Zehnder Optical Filter in Multistage Fiber Amplifiers", IEEE Photonics Technology Letters, vol. 3, No. 8, pp. 718-720, Aug. 1991.

Y. Tamura, et al., "A Travelling-Wave Optical Amplifier Module", Oki Electric Industry Co., Ltd., pp. 491-494.

N.E. Jolley, et al. "Out-of-band Electronic Gain Clamping for a Variable Gain and Output Power EDFA with Low Dynamic Gain Tilt", OFC '97 Technical Digest, pp. 134-135.

M. Nishimura, et al., "Gain-flattened Erbium-Doped Fiber Amplifiers for WDM Transmission", OFC '97 Technical Digest, p. 127.

Hiroo Kanamori; "Optical Components and Fiber Technologies for Erbium-Doped Fiber Amplifier", Fourth Optoelectronics Conference (OEC '92) Technical Digest 1992.

M. Hamada et al.; "Characteristics of Fusion Splice of $Er^{3+}$-Doped Fiber for Optical Amplifier", Fourth Optoelectronics Conference (OEC '92) Technical Digest 1992.

C. R. Giles et al.; "Dynamic Gain Equalization in Two-Stage Fiber Amplifiers";Optical Amplifiers and Their Applications; Technical Digest 1990, Series vol. 13, MD2 48-51.

T. Kakinuma et al.; "Gain and Noise Characteristics of Er-Doped Fiber Amplifiers With Different Pumping Directions"; Optical Amplifiers and Their Applications; Technical Digest 1990, Series vol. 13, TuB1 126-129.

M. Yoshida et al.; "Development of Compact Characteristic of $Er^{3+}$-Doped Fiber Amplifiers for Practical Applications"; Optical Amplifiers and Their Applications; Technical Digest 1990, Series vol. 13; WDI 281-285.

K. Suzuki et al.; "High-Gain Erbium-Doped Fiber Amplifier Pumped by 820 nm GaA/As Laser Diodes"; Optical Amplifiers and Their Applications; Technical Digest 1990, Series vol. 13, MB4 20-23.

B. Mikkelsen et al.; "High Receiver Sensitivity at 2.5 Gb/s Obtained with a Highly Efficient Low Noise Diode Pumped Erbium-Doped Fiber Amplifier"; Optical Amplifiers and Their Applications; Technical Digest 1991, Series vol. 13, FA4-1 192-FA4-4 195.

H. Takenaka et al.; "Compact Size and High Output Power Er-Doped Fiber Amplifier Modules Pumped with 1.48μm MQW LDs"; Optical Amplifiers and Their Applications; Technical Digest 1991, Series vol. 13, FD2-1 254-FD2-4 257.

A. Wada et al.; "High-Efficiency Erbium-Doped Fiber Amplifiers Using Mode Field Diameter Adjusting Technique"; Optical Amplifiers and Their Applications; Technical Digest 1991, Series vol. 13, FD3-1 257-FD3-4 261.

D. Tanaka et al.; "73.6km Attenuation Free Concatenated Fibers Doped With Distributed Erbium"; Optical Amplifiers and Their Applications; Technical Digest 1991, Series vol. 13, ThD4-1 156-ThD4-4 159.

G. R. Jacobovitz-Veselka et al.; "Single-Stage Booster Amplifier With Two 980 nm Pumps Stabilized by Fiber Grating"; Optical Amplifiers and Their Applications; Technical Digest 1995, Series vol. 18; FC4-1 162-FC4-4 165.

Y. Tashiro et al.; "High Power Erbium-Doped Optical Fiber Amplifier"; The Institute of Electronics, Information and Communication Engineers; Technical Report of IEICE, OCS95-86 (Oct. 1995), pp. 67-72 (with English Abstract).

M. Shimizu et al.; "High Saturating Operation of 0.98 μm Laser Diode Pumped Erbium-Doped Fiber Amplifiers"; The Institute of Electronics, Information and Communication Engineers; Proceedings of the 1991 IEICE Fall Conference, Tamagawa University, p. 4-239. (English Language Translation of Section 2).

K. Oosono et al.; "Reliability Study of Er-Doped Optical Fiber"; The Institute of Electronics, Information and Communication Engineers; Proceedings of the 1992 IEICE Fall Conference, Tokyo Institute of Technology, p. 4-282. (English language translation of Section 2 and Table 1).

K. Oosono et al.; "Study of High Output Power Er-Doped Fiber Amplifier"; The Institute of Electronics, Information and Communication Engineers; Proceedings of the 1992 IEICE Fall Conference, Tokyo Institute of Technology, p. 4-283. (English language translation of Section 2).

K. Takano et al.; "An Optical Pre-Amplifier with Automatic Gain Control Function"; The Institute of Electronics, Information and Communication Engineers; Proceedings of the 1995 IEICE General Conference, Fukuoka Institute of Technology, p. 513. (English language translation of Section 2).

Youichi Fukada, et al.;"Gain-Bandwidth and Noise-Figureue Measuring Technique on an Optical In-Line Amplifier"; Technical Report of IEICE; OCS94-69, OPE94-92 (Nov. 1994) (English Abstract).

H. Toba, et al.; "A 100-Channel Optical FDM Transmission/Distribution at 622 Mb/s Over 50 km"; Journal of Lightwave Technology, vol. 8, No. 9, Sep. 1990; pp. 1396-1401.

J.M. P. Delavaux et al.; "Hybrid Er-Doped Fiber Amplifiers at 980-1480 nm for Long Distance Optical Communications"; Electronics Letters Aug. 13, 1992, vol. 28, No. 17.

S. G. Grubb et al.; "Ultrahigh Power Diode-Pumped 1.5-μm Fiber Amplifiers"; OFC '96 Technical Digest Series, vol. 2; Feb. 25-Mar. 1, 1996.

Y. Sugaya et al., "Experimental Investigation for the Designing of EDFA in WDM Transmission System" Proceedings of the 1995 IEICE General Conference B-1098 published on Mar. 10, 1995 (with complete English translation).

Japanese Publication "Er:Doped Fiber Amptifer for WDM Transmission Using Fiber Gain Control", Technical Report of IEICE, OCS94-66, OPE94, Nov. 1994. (including English language translation).

Sugaya et al., Novel configuration for low-noise and wide-dynamic-range Er-doped fiber amplifier for WDM systems, OAA '95 paper FC3, Jun. 16, 1995, 4 pages.

Y. Sugaya et al., "Configuration Design of Multi-wavelength Er-doped Fiber Amplifier for WDM Transmission System" Technical Report of IEICE OCS95-36, published on Jul. 26, 1995. (with complete translation).

Y. Sugaya et al., "Novel Configuration For Low-Noise and Wide-Dynamic-Range Er-Doped Fiber Amplifier For WDM Systems" OAA '95, FC3 (1995).

S.F. Su et al., "Gain Equalization in Multiwavelength Lightwave Systems Using Acoustooptic Tunable Filters" IEEE Photonics Technology Letters, vol. 4, No. 3, Mar. 1992.

H. Toba et al., "A 100-Channel Optical FDM Six-Stage In-Line Amplifier System Employing Tunable Gain Equalizers" IEEE Photonics Technology Letters, vol. 5, No. 2, Feb. 1993.

H. Miyata et al., "Dispersion Compensation Design for 10-Gb/s 16-Wave WDM Transmission System Over Standard Single-Mode Fiber" Technical Report of IEICE, OCS95-34 (Jul. 1995) (Translation of Abstract).

Y. Nakabayashl et al., "Er:Doped Fiber Amplifier for WDM Transmission Using Fiber Gain Control" Technical Report of IEICE, OCS94-66, OPE94439 (Nov. 1994) (Translation of Abstract).

M. Suyama et al., "2.5 Gb/s, 4 Channel WDM Transmission Over 1060 km Using EDFAs With Suppressed Gain Bandwidth Narrowing", OAA '93, pp. 126-129.

V.L. da Silva et al., "Automatic Gain Flattening in Er-Doped-Fiber Amplifiers" OFC/IOOC '93 Technical Digest, pp. 174-175.

T. Sugawa et al., "Optical Amplification in $Er^{3+}$-Doped Single-Mode Fluoride Fiber" IEEE Photonics Technology Letters, vol. 2, No. 7, Jul. 1990.

M. Shigematsu et al., "120 Channel AM-VSB Signal Transmission by 2 Wavelength Multiplexing Through Gain Flattened Hybrid Erbium-Doped Fiber Amplifier" OAA '95, ThB3-1, pp. 13-16.

C. R. Giles et al., "Dynamic Gain Equalization in Two-Stage Fiber Amplifiers", IEEE Photonics Technology Letters, vol. 2, No. 12, Dec. 1990.

S. Yoshida et al., "Common Amplification Characteristics of EDFA With High Aluminium Concentration For Wavelength-Division-Multiplexed Signal" Technical Report of IEICE, CS95-43, OCS95-9 (Jun. 1995) (with English Abstract).

T. Kashiwada et al. "Spectral Gain Behavior of Er-Doped Fiber With Extremely High Aluminum Concentration" OAA '93, pp. 104-107.

Chraplyvy et al., "Equalization in Amplified WDM Lightwave Transmission Systems," IEEE Photonics Tech. Letters, vol. 4, #8, pp. 920-922, Aug. 1992.

Desurvire, E., "Erbium-Doped Fiber Amplifier, Principles and Applications," publ. John Wiley & Sons, Inc., ISBN 0-471-58977-2; Fiber Amplifiers, pp. 480-487.

Kashiwada et al., OFC '95, vol. 8, Mar. 3, 1995, pp. 77-78.

Giles et al., "Dynamic Gain Equalizationin Two-Stage Fiber Amplifiers," IEEE Photonics Tech. Letters, vol. 2, #12, Dec. 1990, pp. 866-869.

Toba, et al., "A 100-Channel Optical FDM Six-Stage In-Line Amplifier System Employing Tunable Gain Equalizers," vol. 5, No. 2, IEEE Photometry Technology Letters, Feb. 1993, pp. 248-251.

Hakamata, Y. et al., "5 Gb/s Transmission Experiment Using 1300 nm Fabry-Prot LD Transmitter Module with GaAs MESFET LD Driver and p-l-n PD Receiver," IEEE Optical Technology Letters, vol. 5, No. 2, Feb. 1993, p. 251 only.

Goossen, et al., "Gain Slope Compensator for Spectrally Linear Optical Power Equalization", IEEE 1999, ThV3, pp. 844-845.

Tsitlik, et al., "Augmentation of Pressure in a Vessel Indenting the Surface of the Lung ", Annals of Biomedical Engineering, vol. 15, pp. 259-284, 1987.

Ku, et al., "Synthesis of Broadband Matching Networks for Microwave Transistor Amplifiers", 1977 IEEE International Symposium on Circuits and Systems Proceedings, pp. 704-707.

Bassini, et al., "A Low-Noise Charge Amplifier with Fast Rise Time and Active Discharge Mechanism", IEEE Transactions on Nuclear Science, vol. 49, No. 5, Oct. 2002.

Steinman, et al., "A New Approach for Determining Maximum Frequency in Clinical Doppler Ultrasound Spectral Estimates", Proceedings of the 22nd Annual EMBS International Conference, Jul. 23-28, 2000, Chicago, Illinois, pp. 2640-2643.

Huth, et al., "Development of an Octal CMOS ASD for the Atlas Muon Detector", pp. 436-437.

Block, et al., "High Energy Predictions for pp and pp Elastic Scattering and Total Cross Sections", Czechoslovak Journal of Physics, vol. 40, No. 2, pp. 164-175, Feb. 1990.

Bouchenaki, et al., "Preparation, Characterization, and Bistable Photoconduction Properties of Thin CdS layers", Journal of the Optical Society of America (Optical Physics), vol. 8, No. 3, pp. 691-700, Mar. 1991.

Mandi, et al., "Low-Noise and High-Gain L-Band EDFA Utilising a Novel Self-Generated Signal-Seeding Technique", Optics Communications, vol. 195, No. 1-4, pp. 241-248, Aug. 2001.

Kitamura, et al., "Photo-Current Multiplication Phenomenon of Amorphous Silicon-Based Multilayer Photodiodes Fabricated on Crystalline Silicon Substrate", Japan Journal Applied Physics, vol. 40, (2001) pp. 4794-4798.

Wiesenfeld, et al., "Wavelength Conversion at 10 Gb/s Using a Semiconductor Optical Amplifier", IEEE Photonics Technology Letters, vol. 5, No, 11, Nov. 1993.

Santiard, et al., "The Gassiplex0.7-2 Integrated Front-End Analog Processor For the HMPID and the Dimuon Spectrometer of Alice", pp. 431-432.

Divsalar, et al., "Hybrid Concatenated Codes and Iterative Decoding", ISIT, 1997, Ulm, Germany, Jun. 29-Jul. 4, 1997, p. 10.

Faloss, et al., "Lasing Performance of Pyromethene and Perylene Laser Dyes in Xerogel Host", OSA Tops on Advanced Solid-State Lasers, 1996, vol. 1, pp. 69-71.

Yeh, et al., "Viable Deep-Submicron FD/SOI CMOS Design for Low-Voltage Applications", Proceedings 1994 IEEE International SOI Conference, Oct. 1994, pp. 23-24.

Kizhaev, et al., "Lasing in InGaAsP/InP Distributed-Feedback Lasers with a Large Difference between the Bragg Wavelength and the Gain Maximum of The Active Layer" , Sov. Tech. Phys. Letters, vol. 14, No. 2, pp. 119-121, Feb. 1988.

Weinberger, "FM-To-AM Converter for Satellite Direct Broadcast TV", IEEE Transactions on Consumer Electronics, vol. CE-21, No. 4, pp. 404-409, Nov. 1975.

Japanese language Office Action mailed Apr. 8, 2003, in Japanese Application 7-049917.

Office Action mailed Sep. 13, 2000 in U.S. Appl. No. 09/264,902.

Office Action mailed Apr. 11, 2001 in U.S. Appl. No. 09/264,902.

Office Action mailed Nov. 7, 2001 in U.S. Appl. No. 09/264,902.

Notice of Allowance and Fee(s) Due mailed Apr. 9, 2002 in U.S. Appl. No. 09/264,902.

Supplemental Notice of Allowability mailed Jun. 10, 2002 in U.S. Appl. No. 09/264,902.

Notice of Allowance and Fee(s) Due mailed Jun. 17, 2002 in U.S. Appl. No. 09/264,902.

Notice of Allowance and Fee(s) Due mailed Sep. 23, 2002 in U.S. Appl. No. 09/264,902.
Notice of Allowance and Fee(s) Due mailed Jan. 22, 2003 in U.S. Appl. No. 09/264,902.
Issue Notification mailed Jul. 17, 2003 in U.S. Appl. No. 09/264,902.
Restriction Requirement mailed Jan. 13, 2005 in U.S. Appl. No. 10/414,237.
Office Action mailed Jun. 8, 2004 in U.S. Appl. No. 10/414,237.
Office Action mailed Mar. 10, 2005 in U.S. Appl. No. 10/414,237.
Office Action mailed Aug. 26, 2005 in U.S. Appl. No. 10/414,237.
Notice of Allowance and Fee(s) Due mailed Mar. 6, 2006 in U.S. Appl. No. 10/414,237.
Issue Notification mailed May 24, 2006 in U.S. Appl. No. 10/414,237.
Japanese Patent Office Notification of Reasons of Rejection dated Dec. 28, 2004, for corresponding Japanese Patent Application No. 11-074371.
Japanese Patent Office Decision dated May 30, 2005, for corresponding Japanese Patent Application No. 11-074371.
Japanese Patent Office Notification of Reasons of Rejection mailed Nov. 21, 2000 for corresponding Japanese Patent Application No. 11-074371.
Japanese Patent Office Decision of Rejection mailed Jul. 10, 2001 for corresponding Japanese Patent Application No. 11-074371.
Quayle Office Action mailed Nov. 2, 2010 in U.S. Appl. No. 12/822,797.
Appeal Examination Report, dated Mar. 28, 2008, included in an Inquiry of JPO issued Feb. 23, 2010, in corresponding Japanese application 2005-70373.

* cited by examiner

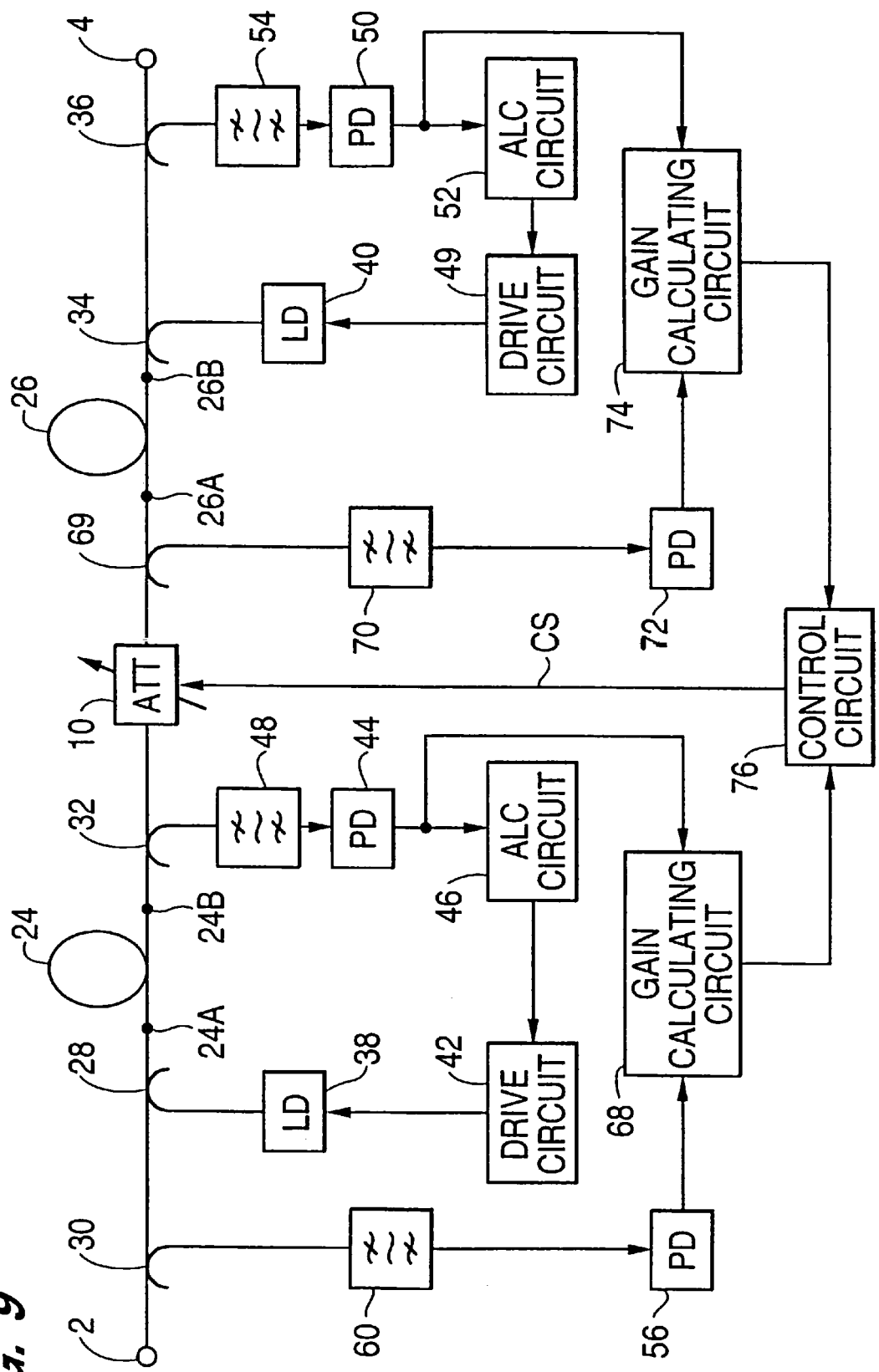

GAIN AND SIGNAL LEVEL ADJUSTMENTS OF CASCADED OPTICAL AMPLIFIERS

CROSS-REFERENCE TO RELATED APPLICATION

This application is a divisional of application number 10/414,237. filed Apr. 16, 2003. now U.S. Pat. No. 7,061,666, which is a divisional of application number 09/264.902. filed Mar. 9. 1999, now U.S. Pat. No. 6,603,596, issued Aug. 5, 2003.

This application is based on, and claims priority to, Japanese application number 10-70251, filed on Mar. 19, 1998, in Japan, and which is incorporated herein by reference.

This application is also based on, and claims priority to, Japanese application number 10-258114, filed on Sep. 11, 1998, in Japan, and which is incorporated herein by reference.

BACKGROUND OF THE INVENTION

1. Field of the Invention

The present invention relates to cascaded optical amplifiers and, more particularly, to gain and signal level adjustments of cascaded optical amplifiers.

2. Description of the Related Art

Optical communication systems using optical fiber transmission lines are being used to transmit relatively large amounts of information. For this purpose, low-loss (e.g., 0.2 dB/km) optical fibers have been manufactured and used as optical fiber transmission lines. In addition, optical amplifiers are used to compensate for losses in the optical fiber transmission line to thereby allow long-haul transmission.

A conventional optical amplifier includes an optical amplifying medium which is pumped with pump light to provide a gain band. The optical amplifying medium and pump light are chosen so that they provide a gain band which includes a wavelength of signal light. As a result, the signal light will be amplified as the signal light travels through the optical amplifying medium. For example, an erbium doped fiber amplifier (EDFA) includes an erbium doped fiber (EDF) as the optical amplifying medium. A pumping light source supplies pump light having a predetermined wavelength to the EDF. By setting the wavelength of the pump light within a 0.98 μm band or a 1.48 μm band, a gain band including a wavelength band of 1.55 μm can be obtained. Therefore, signal light in the 1.55 μm wavelength band will be amplified.

Another type of conventional optical amplifier has a semiconductor chip as the optical amplifying medium. In this case, pumping is performed by injecting an electric current into the semiconductor chip.

Further, wavelength division multiplexing (WDM) is a known technique for increasing transmission capacity through a single optical fiber. In a system adopting WDM, a plurality of optical carriers having different wavelengths are individually modulated with data. Thus, each modulated carrier represents a channel of the WDM system transmitting an optical signal. The optical signals (that is, the modulated carriers) are then wavelength division multiplexed by an optical multiplexer to obtain WDM signal light. The WDM signal light is then transmitted through an optical fiber transmission line. The WDM signal light is received through the transmission line, and then demultipexed into individual optical signals by an optical demultiplexer. Data can then be detected from these individual optical signals. Therefore, by applying WDM, the transmission capacity of a single optical fiber can be increased in accordance with the number of WDM channels multiplexed together and transmitted through the optical fiber.

When an optical amplifier is inserted along the transmission line in an optical communication system adopting WDM, a transmission distance is limited by the wavelength characteristic of gain which is represented by a gain tilt or gain deviation of the optical amplifier. For example, in an EDFA, it is known that a gain tilt is produced at wavelengths in the vicinity of 1.55 μm, and this gain tilt varies with total input power of signal light and pump light power to the EDFA.

There is an optical amplification device for optical amplification which can maintain the wavelength characteristic of gain constant and obtain a wide input dynamic range. The optical amplification device includes first and second optical amplifiers and a variable optical attenuator optically connected between the first and second optical amplifiers. Automatic gain control (AGC) is applied to each of the first and second optical amplifiers, thereby maintaining constant the wavelength characteristic of gain of each of the first and second optical amplifiers. Further, automatic output level control (ALC) is performed for the second optical amplifier by using the variable optical attenuator, thereby obtaining a wide input dynamic range. That is, the output level of the second optical amplifier is maintained constant irrespective of the input level of the first optical amplifier, so that the input dynamic range of this device is widened.

In such an optical amplification device, AGC is performed so that the gain of the first optical amplifier is maintained constant irrespective of the input level of the first optical amplifier. Accordingly, there arises a problem such that when the power of signal light to be supplied to the first optical amplifier is increased, the power of pump light must be increased by the corresponding amount to increase the output power of the first optical amplifier to provide the required gain. That is, a high-power pumping light source is required for the first optical amplifier to ensure a required input dynamic range.

SUMMARY OF THE INVENTION

Accordingly, it is an object of the present invention to provide an optical amplification device and method which does not require a high-power pumping light source.

It is an additional object of the present invention to provide an optical amplification device and method which can maintain the wavelength characteristic of gain constant and can obtain a wide input dynamic range, while requiring a relatively low power pump light.

Additional objects and advantages of the invention will be set forth in part in the description which follows, and, in part, will be obvious from the description, or may be learned by practice of the invention.

The foregoing objects of the present invention are achieved by providing an apparatus comprising first and second optical amplifiers, and a controller. The first optical amplifier receives a light and amplifies the received light. The second optical amplifier receives the light amplified by the first optical amplifier, and amplifies the received light. The controller, when a level of the light received by the first optical amplifier changes by $\Delta$, controls a level of the light received by the second optical amplifier to change by approximately $-\Delta$.

Objects of the present invention are further achieved by providing an apparatus which includes first and second optical amplifiers, a variable attenuator and a controller. The first optical amplifier receives a light and amplifies the received light. The second optical amplifier receives the light amplified by the first optical amplifier, and amplifies the received light. The variable attenuator is optically connected between the first and second optical amplifiers. The controller controls attenuation of the variable attenuator so that, when a level of the light received by the first optical amplifier changes by Δ, a level of the light received by the second optical amplifier changes by approximately −Δ.

Objects of the present invention are further achieved by providing an optical communication system. In the optical communication system, optical transmitters transmit optical signals at different wavelengths. A multiplexer multiplexes the optical signals into a wavelength division multiplexed (WDM) signal light. The WDM signal light is transmitted through an optical fiber transmission line. An optical amplification device amplifies the WDM signal light as the WDM signal light is transmitted through the transmission line. The optical amplification device includes first and second optical amplifiers and a controller. The first optical amplifier receives the WDM signal light and amplifies the received WDM signal light. The second optical amplifier receives the WDM signal light amplified by the first optical amplifier, and amplifies the received WDM signal light. The controller, when a level of the WDM signal light received by the first optical amplifier changes by Δ, controls a level of the WDM signal light received by the second optical amplifier to change by approximately −Δ.

Objects of the present invention are further achieved by providing an apparatus which includes optical amplifiers optically connected together, each optical amplifier having a corresponding gain. A controller causes the sum of the gains of the optical amplifiers to be constant. There can be two or more optical amplifiers optically connected together in this manner.

In addition, objects of the present invention are achieved by providing an apparatus comprising first and second optical amplifiers connected together, and a controller causing the sum of the gains of the first and second optical amplifiers to be constant. The controller can include a variable attenuator optically connected between the first and second optical amplifiers, where the attenuation of the variable attenuator is controlled to cause the sum of the gains of the first and second optical amplifiers to be constant.

Further, objects of the present invention are achieved by providing an apparatus which includes first and second optical amplifiers, and a gain adjustor. The first optical amplifier amplifies a light with a gain of the first optical amplifier. The second optical amplifier receives the light amplified by the first optical amplifier, and amplifies the received light with a gain of the second optical amplifier. The gain adjustor detects a deviation in gain of the first optical amplifier from a target gain, and adjusts the gain of the second optical amplifier to compensate for the detected deviation.

Objects of the present invention are also achieved by providing an apparatus including a first optical amplifier which amplifies a light with a gain of the first optical amplifier. A first gain controller controls the gain of the first optical amplifier to be constant at a target gain. A second optical amplifier receives the light amplified by the first optical amplifier, and amplifies the received light with a gain of the second optical amplifier. A gain deviation detector detects a deviation in gain of the first optical amplifier from the target gain. A gain adjustor adjusts the gain of the second optical amplifier to compensate for the detected deviation in gain of the first optical amplifier. A level controller can control a level of the light amplified by the first optical amplifier before being amplified by the second optical amplifier to be at a target level, wherein the level controller adjusts the target level to compensate for a detected deviation in gain of the first optical amplifier by the gain deviation detector.

Moreover, objects of the present invention are achieved by providing an optical amplifying device which includes first and second optical amplifiers. The first optical amplifier amplifies a light with a gain of the first optical amplifier. A first gain controller controls the gain of the first optical amplifier to be constant at a target gain for the first optical amplifier. The second optical amplifier receives the light amplified by the first optical amplifier, and amplifies the received light with a gain of the second optical amplifier. A second gain controller controls the gain of the second optical amplifier to be constant at a target gain for the second optical amplifier. A gain deviation detector detects a deviation in gain of the first optical amplifier from the target gain of the first optical amplifier. A gain adjustor adjusts the target gain of the second optical amplifier to compensate for the detected deviation in gain of the first optical amplifier.

Objects of the present invention are also achieved by providing an apparatus including first and second optical amplifiers and a gain adjustor. The first optical amplifier amplifies a light with a gain of the first optical amplifier. The second optical amplifier receives the light amplified by the first optical amplifier, and amplifies the received light with a gain of the second optical amplifier. The gain adjustor detects a deviation in gain of one of the first and second optical amplifiers from a target gain, and adjusts the gain of the other of the first and second optical amplifiers to compensate for the detected deviation.

In addition, objects of the present invention are achieved by providing an apparatus which includes a first optical amplifier amplifying a light with a gain of the first optical amplifier. A first gain controller controls the gain of the first optical amplifier to be constant at a target gain for the first optical amplifier. A second optical amplifier receives the light amplified by the first optical amplifier, and amplifies the received light with a gain of the second optical amplifier. A second gain controller controls the gain of the second optical amplifier to be constant at a target gain for the second optical amplifier. A gain adjustor detects a deviation in gain of one of the first and second optical amplifiers from its target gain, and adjusts the gain of the other of the first and second optical amplifiers to compensate for the detected deviation.

Objects of the present invention are achieved by providing an apparatus which includes a plurality of optical amplifiers cascaded together so that a light is amplified by each optical amplifier as the light travels through the cascaded plurality of optical amplifiers, each optical amplifier amplifying the light with a corresponding gain. A gain adjustor detects a deviation in gain of one of the plurality of optical amplifiers from a target gain, and adjusts the gain of at least one of the other of the plurality of optical amplifiers to compensate for the detected deviation.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 9 is a diagram illustrating details of the optical amplification device in FIG. 8, according to an embodiment of the present invention.

DETAILED DESCRIPTION OF THE PREFERRED EMBODIMENTS

Figure 1:
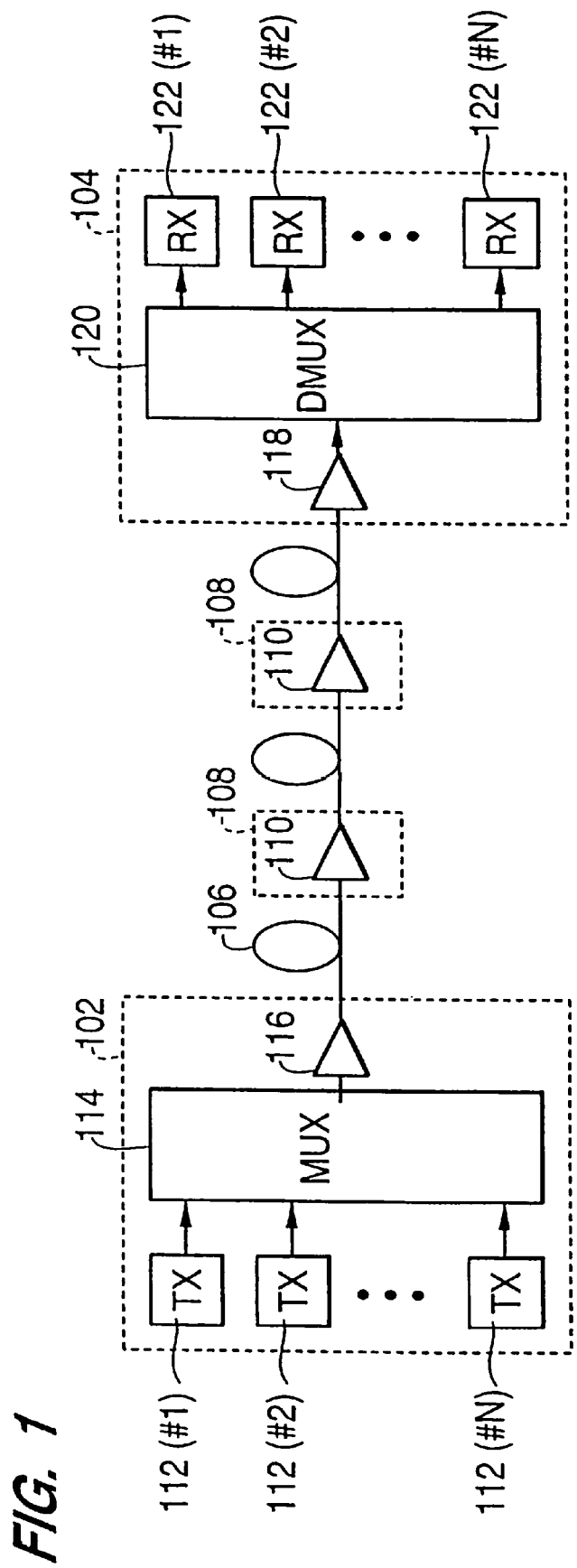
FIG. 1 is a diagram illustrating an optical fiber communication system, according to an embodiment of the present invention.

Reference will now be made in detail to the present preferred embodiments of the present invention, examples of which are illustrated in the accompanying drawings, wherein like reference numerals refer to like elements throughout.

FIG. 1 is a diagram illustrating an optical fiber communication system, according to an embodiment of the present invention. Referring now to FIG. 1, the system includes a first terminal station 102, a second terminal station 104, an optical fiber transmission line 106 connecting terminal stations 102 and 104, and a plurality of optical repeaters 108 arranged along optical fiber transmission line 106. Each optical repeater 108 includes an optical amplifier 110 optically connected to optical fiber transmission line 106. Although FIG. 1 shows two optical repeaters 108, more than two optical repeaters can be used, depending on the system design parameters. Further, in some systems, a single optical repeater may be used.

First terminal station 102 includes a plurality of optical transmitters (TX) 112 (#1 to #N) respectively outputting a plurality of optical signals having different wavelengths. An optical multiplexer (MUX) 114 wavelength division multiplexes the optical signals output from optical transmitters 112 (#1 to #N) to obtain WDM signal light. An optical amplifier (postamplifier) 116 amplifies the WDM signal light obtained from optical multiplexer 114 to output an amplified WDM signal light to optical fiber transmission line 106.

Second terminal station 104 includes an optical amplifier (preamplifier) 118 amplifying the WDM signal light from optical fiber transmission line 106. An optical demultiplexer (DMUX) 120 demultiplexes the amplified WDM signal light output from optical amplifier 118 into a plurality of optical signals. A plurality of optical receivers (RX) 122 (#1 to #N) respectively receive the optical signals from optical demultiplexer 120.

With this configuration, loss of the WDM signal light can be compensated by at least one optical repeater 108 arranged along optical fiber transmission line 106, thereby allowing long-haul transmission. Furthermore, a plurality of channels are transmitted by optical fiber transmission line 106, thereby increasing a transmission capacity.

Figure 2:
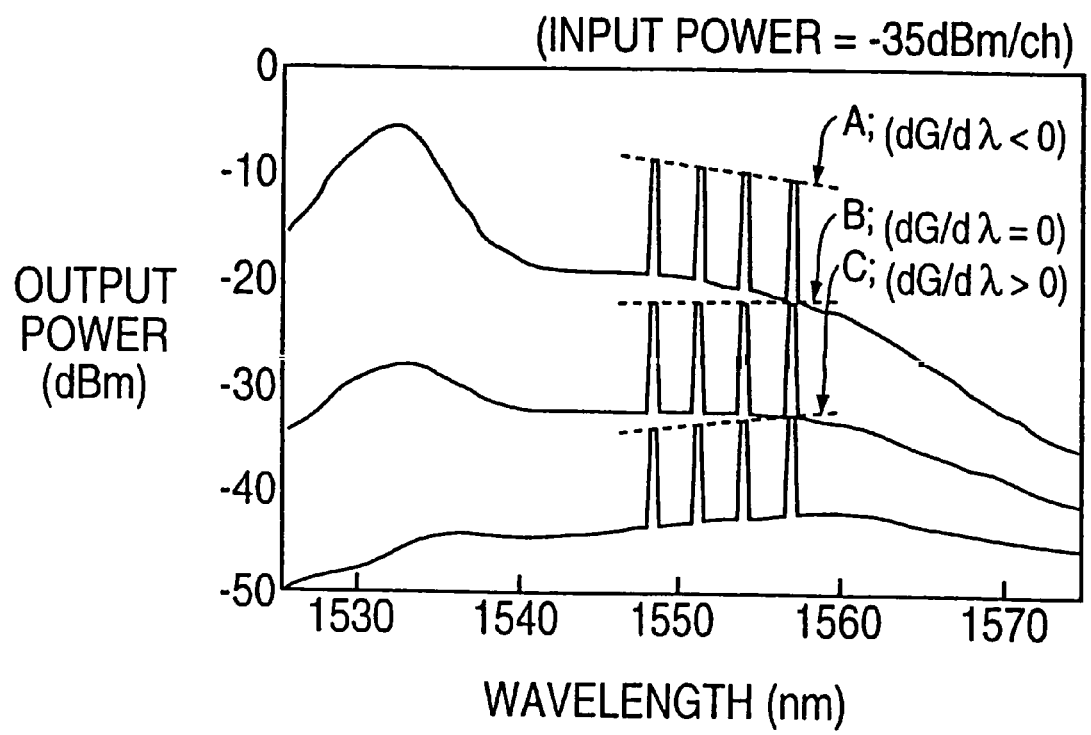
FIG. 2 is a graph illustrating a gain tilt occurring in an optical amplifier.

FIG. 2 is a graph illustrating gain tilt occurring in an optical amplifier. More specifically, FIG. 2 illustrates the spectra of output light when WDM signal light based on optical signals of four channels (wavelengths of 1548, 1551, 1554, and 1557 nm, respectively) having the same power (−35 dBm/ch) is input into an EDFA (erbium doped fiber amplifier). In FIG. 2, the vertical axis represents output power (dBm), and the horizontal axis represents wavelength (nm).

The spectrum shown by A corresponds to the case where the power of pump light is relatively high, causing a negative gain tilt in a band of about 1.54 to 1.56 μm. That is, the negative gain tilt is a gain tilt such that the gain decreases with an increase in wavelength, and the derivative of gain (G) with respect to wavelength (λ) is negative (dG/dλ<0).

The spectrum shown by C corresponds to the case where the power of pump light is relatively low, causing a positive gain tilt in a band of about 1.54 to 1.56 μm. That is, the positive gain tilt is a gain tilt such that the gain increases with an increase in wavelength, and the derivative of gain (G) with respect to wavelength (λ) is positive (dG/dλ>0).

The spectrum shown by B corresponds to the case where the power of pump light is optimum so that no gain tilt is induced or the gain tilt becomes flat in a band of about 1.54 to 1.56 μm, and the derivative of gain (G) with respect to wavelength (λ) is zero (dG/dλ=0).

Each spectrum has such a shape that four sharp spectra corresponding to the optical signals of the four channels are superimposed on a gentle spectrum of ASE (amplified spontaneous emission). It is known that the wavelength characteristic of gain for a small signal depends on an ASE spectrum.

In the case that a plurality of optical amplifiers are cascaded as shown in FIG. 1, a gain tilt occurring in each optical amplifier is accumulated over the optical fiber transmission line, causing a degradation in signal-to-noise ratio in a low-level channel or a degradation in waveform due to nonlinear effects or the like in a high-level channel, so that a transmission distance for obtaining a required receiving sensitivity is limited. Accordingly, in this kind of system, it is greatly effective in increasing a transmission distance to perform a control such that the gain tilt in each optical amplifier becomes flat. Further, the output level of each optical amplifier has an optimum range. Accordingly, by controlling the output level of each optical amplifier so that it always falls within the optimum range irrespective of the input level of each optical amplifier, the input dynamic range can be widened.

Figure 3:
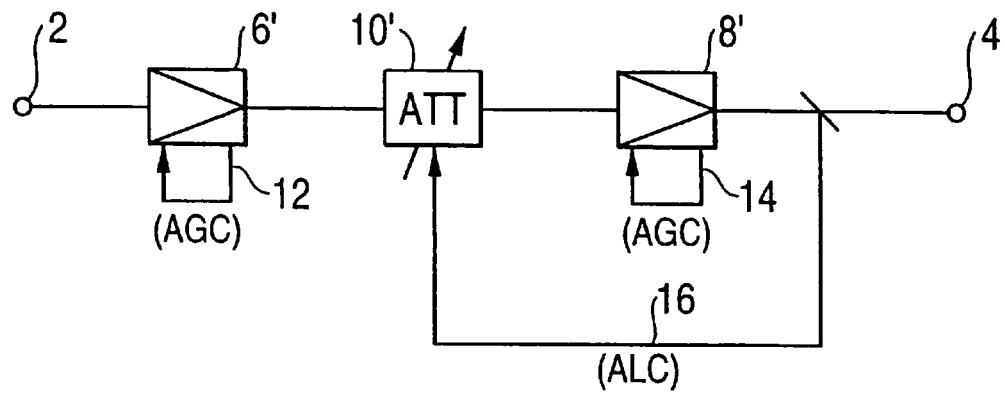
FIG. 3 (prior art) is a diagram illustrating a conventional optical amplification device.

FIG. 3 is a diagram of a conventional optical amplification device for use as each of optical amplifiers 110, 116 and 118 in FIG. 1. Referring now to FIG. 3, a first-stage optical amplifier 6' and a second-stage optical amplifier 8' are cascaded between an input port 2 and an output port 4, and a variable optical attenuator (ATT) 10' is optically connected between optical amplifiers 6' and 8'. Optical amplifier 6' is provided with a feedback loop 12 for automatic gain control (AGC), and optical amplifier 8' is provided with a feedback loop 14 for AGC. Variable optical attenuator 10' is included in a feedback loop 16 for automatic level control (ALC) to maintain a constant output level of the optical amplification device.

In FIG. 3, AGC is performed in each of optical amplifiers 6' and 8', so that the wavelength characteristic of gain in each of optical amplifiers 6' and 8' can be maintained constant. Furthermore, since feedback loop 16 for ALC is provided independently of feedback loops 12 and 14 for AGC, a wide input dynamic range can be obtained.

However, with the optical amplification device in FIG. 3, there is a problem that an excessive pump light power may be required in the case that first-stage optical amplifier 6' includes an erbium doped fiber (EDF) and a pumping light source for supplying pump light to the EDF. This problem will now be more specifically described.

Figure 4:
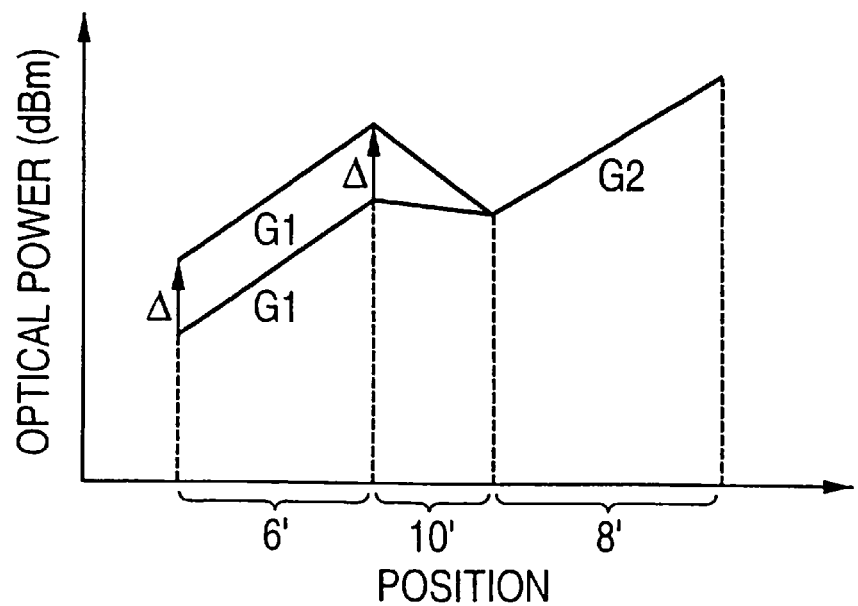
FIG. 4 is a power diagram for the optical amplification device in FIG. 3.

FIG. 4 is a power diagram of the optical amplification device in FIG. 3. In FIG. 4, the vertical axis represents optical power (dBm), and the horizontal axis represents position on an optical path extending from input port 2 to output port 4. Assuming that the input level of first-stage optical amplifier 6' increases by $\Delta$, the output level of optical amplifier 6' also increases by $\Delta$ because the gain G1 of the optical amplifier 6' is maintained constant irrespective of the input level by feedback loop 12. The gain G2 of second-stage optical amplifier 8' is also maintained constant by feedback loop 14. Accordingly, the attenuation to be given by variable optical attenuator 10' is increased by the operation of feedback loop 16 for ALC so that the output level of second-stage optical amplifier 8' is maintained constant.

In general, high-power pump light is required to obtain a high output level of an EDFA. Accordingly, in the case of using an EDFA as first-stage optical amplifier 6', high-power pump light is required to accept a high input level. That is, with the optical amplification device in FIG. 3, high-power pump light may be required to obtain a wide input dynamic range.

Figure 5:
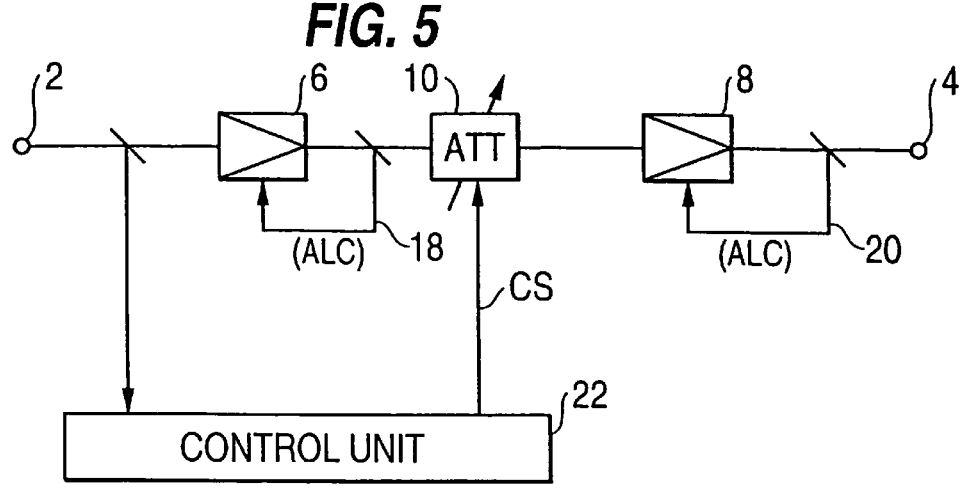
FIG. 5 is a diagram illustrating an optical amplification device, according to an embodiment of the present invention.

FIG. 5 is a diagram illustrating an optical amplification device, according to an embodiment of the present invention. Referring now to FIG. 5, a first-stage optical amplifier 6 and a second-stage optical amplifier 8 are cascaded between an input port 2 and an output port 4, and a variable optical attenuator 10 is optically connected between optical amplifiers 6 and 8. Variable optical attenuator 10 variably attenuates the transmitted light in accordance with a control signal CS supplied thereto. Signal light (such as WDM signal light) supplied to input port 2 and to be amplified is sequentially subjected to amplification by optical amplifier 6, attenuation by variable optical attenuator 10, and amplification by optical amplifier 8, and is finally output from output port 4. Optical amplifier 6 is additionally provided with a feedback loop 18 for ALC. Feedback loop 18 serves to control optical amplifier 6 so that the output level of optical amplifier 6 is maintained constant. Similarly, optical amplifier 8 is additionally provided with a feedback loop 20 for ALC. Feedback loop 20 serves to control optical amplifier 8 so that the output level of optical amplifier 8 is maintained constant.

In this embodiment, the input level of first-stage optical amplifier 6 is detected, and the control signal CS is generated from a control unit 22 so that, when the input level of optical amplifier 6 changes by $\Delta$ (dBm in unit), the input level of optical amplifier 8 changes by $-\Delta$.

Therefore, in FIG. 5, control unit 22 and variable optical attenuator 10 together operate as a controller which, when a level of the light received by optical amplifier 6 changes by $\Delta$, controls a level of the light received by optical amplifier 8 to change by approximately $-\Delta$.

Optical amplifiers 6 and 8 each may include an optical amplifying medium and a pumping light source. The pumping light source provides pump light to the optical amplifying medium. Signal light (such as WDM signal light) is then amplified as it travels through the optical amplifying medium, as long as the optical amplifying medium and the pump light provide a gain band which includes a wavelength of the signal light. The term of "gain band" is defined as a band in which the optical amplifying medium can generate a gain.

In the case that a doped fiber doped with a dopant including a rare earth element is used as the optical amplifying medium, the doped fiber can be pumped by supplying pump light having a predetermined wavelength to the doped fiber. In this case, the gain generated in the optical amplifying medium or the output level of the optical amplifying medium depends on the power of the pump light, so that a pumping light source may be included in the feedback loop for ALC.

In the case that an EDF is used as the optical amplifying medium, a laser diode oscillating in a 0.98 μm band (0.96 to 1.0 μm) or in a 1.48 μm band (1.46 to 1.50 μm) may be used as the pumping light source to thereby obtain a gain band including a 1.55 μm band (1.50 to 1.60 μm).

In the case that a semiconductor chip obtained by reducing the reflectance of opposite end faces of a laser diode is used as the optical amplifying medium, the pumping can be performed by injecting a current into the semiconductor chip. In this case, the gain generated in the semiconductor chip or the optical output level of the semiconductor chip depends on the injected current, so that a drive circuit for the semiconductor chip may be included in the feedback loop for ALC.

Figure 6:
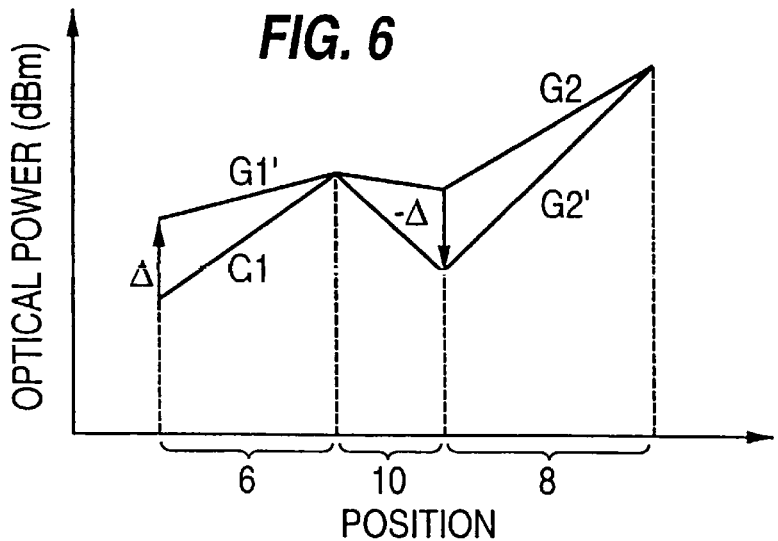
FIG. 6 is a graph illustrating power levels for the optical amplification device in FIG. 5, according to an embodiment of the present invention.

FIG. 6 is a graph illustrating power levels in the optical amplification device of FIG. 5, according to an embodiment of the present invention. In FIG. 6, the vertical axis represents optical power (dBm), and the horizontal axis represents position on an optical path extending from input port 2 to output port 4.

Referring now to FIGS. 5 and 6, assuming that the input level of first-stage optical amplifier 6 increases by $\Delta$ (dBm in unit), the gain generated in optical amplifier 6 decreases from G1 (dB in unit) to G1' (dB in unit) because the output level of optical amplifier 6 is maintained constant by the feedback loop 18 for ALC. The attenuation of variable optical attenuator 10 is controlled by control unit 22, so that the input level of second-stage optical amplifier 8 changes by −Δ. When the input level of optical amplifier 8 thus decreases by Δ, the gain generated in optical amplifier 8 increases from G2 (dB in unit) to G2' (dB in unit) because the output level of optical amplifier 8 is maintained constant by feedback loop 20 for ALC.

Accordingly, the output level of second-stage optical amplifier 8 is constant irrespective of the input level of first-stage optical amplifier 6. Further, the sum of the gain generated in optical amplifier 6 and the gain generated in optical amplifier 8 is constant irrespective of the input level of optical amplifier 6. That is, the relation of G1+G2=G1'+G2' is satisfied.

Therefore, as can be seen from FIG. 6, the total gain of a plurality of cascaded optical amplifiers is maintained constant. Although FIGS. 5 and 6 show only two optical amplifiers, the present invention is not intended to be limited in this manner. Instead, the present invention is applicable to a configuration of more than two optical amplifiers cascaded together, so that the total gain of the cascaded optical amplifiers is maintained constant.

By maintaining constant the total sum of the gains generated in a plurality of cascaded optical amplifiers, the wavelength characteristic of gain can be maintained constant. This will now be described more specifically in the case of cascading a plurality of doped fibers each doped with a dopant including a rare earth element.

In general, the wavelength characteristic $G(\lambda)$ of the gain of one doped fiber is expressed as follows:

$$G(\lambda) = \{tg^*(\lambda) - (1-t)\alpha(\lambda)\}L$$

where $g^*(\lambda)$ (dB/m) is the emission spectrum, $\alpha$ (dB/m) is the absorption spectrum, t is the population inversion coefficient (inversion parameter) of the doped fiber in its longitudinal direction, and L (m) is the length of the doped fiber.

Accordingly, in the case of cascading a plurality of doped fibers having the same emission spectrum and the same absorption spectrum, the total gain $G_{total}(\lambda)$ is given as follows:

$$G_{total}(\lambda) = \sum_k \{t_k g^*(\lambda) - (1-t_k)\alpha(\lambda)\} L_k$$

$$= \left(\sum_k t_k L_k\right) g^*(\lambda) - \left(\sum_k L_k - \sum_k L_k t_k\right) \alpha(\lambda)$$

$$= \left\{\left(\sum_k t_k L_k / L_{total}\right) g^*(\lambda) - \left(1 - \sum_k L_k t_k / L_{total}\right) \alpha(\lambda)\right\}$$

where $t_k$ and $L_k$ are the population inversion coefficient and the length of the k-th doped fiber, respectively, and $L_{total}$ is the total length $$\left(\sum_k L_k\right)$$

of the cascaded doped fiber.

Accordingly, by maintaining constant the total sum of the gains generated in a plurality of cascaded optical amplifiers, the wavelength characteristic of gain of the amplifier chain can be maintained constant.

Particularly, in FIG. 5, feedback loops 18 and 20 for ALC and control unit 22 for variable optical attenuator 10 are used, so that the total sum of the gains generated in the optical path extending from input port 2 to output port 4 can be maintained constant. Accordingly, by using an optical amplification device of the embodiments of the present invention as each of optical amplifiers 110, 116, and 118 in FIG. 1, accumulation of gain tilts can be prevented to thereby allow an increase in transmission distance.

Further, since feedback loop 20 for ALC is provided for second-stage optical amplifier 8, the output level of second-stage optical amplifier 8 can be maintained constant irrespective of the input level of first-stage optical amplifier 6, thereby widening the input dynamic range.

Further, feedback loop 18 for ALC is provided also for first-stage optical amplifier 6. Therefore, in the case that optical amplifier 6 includes a doped fiber and a pumping light source, an undesirable increase in pump light power can be prevented, thus avoiding the problem in the related art shown in FIG. 3.

In addition, to maximize the obtainable total gain in the configuration of FIG. 5, the attenuation of variable optical attenuator 10 may be controlled to become a minimum when the input level of first-stage optical amplifier 6 is a lower limit.

Figure 7:
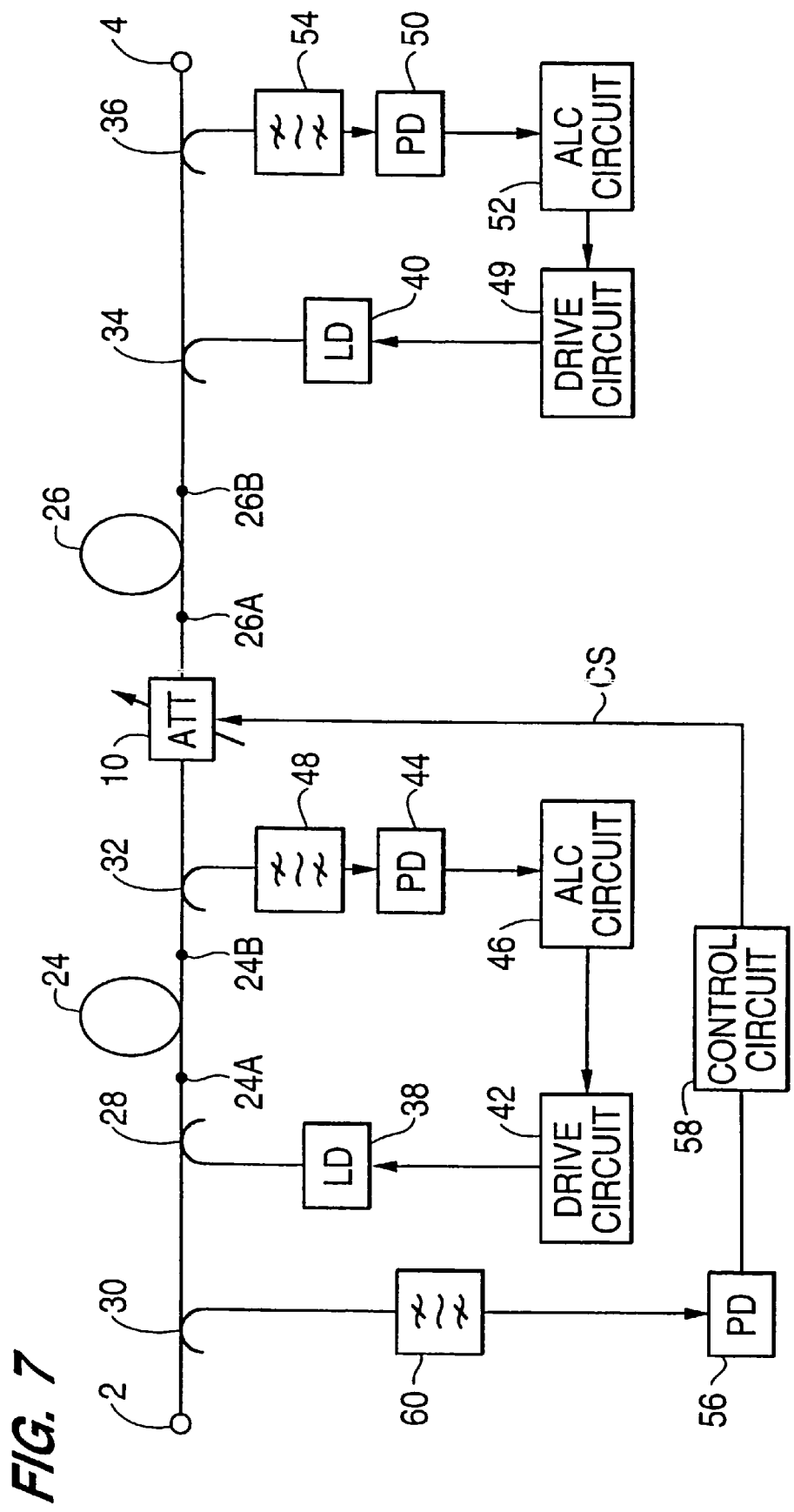
FIG. 7 is a diagram illustrating details of the optical amplification device in FIG. 5, according to an embodiment of the present invention.

FIG. 7 is a diagram illustrating details of the optical amplification device in FIG. 5, according to an embodiment of the present invention. Referring now to FIG. 7, EDFs 24 and 26 are adopted as the optical amplifying medium of optical amplifiers 6 and 8, respectively, to obtain a gain band including a 1.55 μm band where a lowest loss is obtained in a silica fiber. A first end 24A of EDF 24 is optically connected through a WDM coupler 28 and an optical coupler 30 to input port 2, and a second end 24B of EDF 24 is optically connected through an optical coupler 32 to an input port of variable optical attenuator 10. A first end 26A of EDF 26 is optically connected to an output port of variable optical attenuator 10, and a second end 26B of EDF 26 is optically connected through a WDM coupler 34 and an optical coupler 36 to output port 4.

To prevent formation of an optical resonator structure including each of EDFs 24 and 26, one or more optical isolators may be provided in the optical path between input port 2 and output port 4. With this arrangement, the operation stability of the device can be improved.

Optical couplers 30 and 32 are used to detect the input level and the output level of first-stage optical amplifier 6, respectively, and optical coupler 36 is used to detect the output level of second-stage optical amplifier 8. Accordingly, each of optical couplers 30, 32 and 36 can be fabricated without especially considering the wavelength dependence of branching ratio.

WDM coupler 28 is used to supply pump light from a laser diode (LD) 38 into EDF 24 from its first end 24A, and WDM coupler 34 is used to supply pump light from a laser diode 40 into EDF 26 from its second end 26B. The wavelength of each pump light is different from the wavelength of signal light to be amplified. Accordingly, each of WDM couplers 28 and 34 is fabricated in consideration of the wavelength dependence of branching ratio. The oscillation wavelength of each of laser diodes 38 and 40 is set to fall within a 0.98 μm band or a 1.48 μm band, for example, to obtain a gain band including a 1.55 μm band.

A drive current (bias current) is supplied from a drive circuit 42 to laser diode 38. Feedback loop 18 for ALC for optical amplifier 6 includes a photodetector (PD) 44 such as a photodiode and an ALC circuit 46. Monitor light branched by optical coupler 32 is supplied through an optical bandpass filter 48 to photodetector 44. Photodetector 44 outputs an electrical signal having a voltage level (or current level) corresponding to the power of the received monitor light. ALC circuit 46 receives the output signal from photodetector 44 and controls the drive current to be supplied from drive circuit 42 to laser diode 38 so that the level of the received signal becomes constant.

The pass band of optical bandpass filter 48 is set so as to include the wavelength of the signal light amplified in EDF 24 and not to include the wavelength of the residual pump light from laser diode 38 having not contributed to the optical amplification in EDF 24. This setting allows ALC such that the output level of the signal light amplified in EDF 24 becomes constant.

Laser diode 40 as the pumping light source for second-stage optical amplifier 8 is supplied with a drive current (bias current) from a drive circuit 49. Feedback loop 20 for ALC for second-stage optical amplifier 8 includes a photodetector 50 and an ALC circuit 52.

Monitor light branched by optical coupler 36 is supplied through an optical bandpass filter 54 to photodetector 50. Photodetector 50 outputs an electrical signal having a voltage level (or current level) corresponding to the power of the received monitor light. ALC circuit 52 controls the drive current to be supplied from drive circuit 49 to laser diode 40 so that the level of the output signal from photodetector 50 becomes constant. Thus, the ALC for second-stage optical amplifier 8 is achieved by feedback loop 20 as similarly to feedback loop 18.

Control unit 22 for generating the control signal CS includes a photodetector 56 and a control circuit 58. Monitor light branched by optical coupler 30 is supplied through an optical bandpass filter 60 to photodetector 56. Photodetector 56 outputs an electrical signal having a voltage level (or current level) corresponding to the power of the received monitor light. Control circuit 58 detects a change in the input level of the signal light to be supplied into EDF 24 and to be amplified therein, according to the output signal from photodetector 56, and generates the control signal CS so that an opposite amount is given to the input level of EDF 26 by variable optical attenuator 10.

The pass band of each of optical bandpass filters 54 and 60 is set so as to include the wavelength of the signal light to be amplified. In particular, the pass band of optical bandpass filter 54 is preferably set so as not to include the wavelength of the pump light, thereby eliminating the influence of the pump light from laser diode 38.

According to this embodiment of the present invention, the total gain generated in the optical path extending from input port 2 to output port 4 can be maintained constant to thereby maintain the wavelength characteristic of gain constant. Furthermore, the output level at output port 4 can be maintained constant irrespective of the input level at input port 2, thereby widening the input dynamic range of the device.

Moreover, ALC is performed so that the output level of the signal light amplified in EDF 24 becomes constant, thereby preventing an undesirable increase in the power of the pump light to be output from laser diode 38.

In this embodiment of the present invention, the signal light and the pump light propagate in the same direction in EDF 24 of first-stage optical amplifier 6. In other words, first-stage optical amplifier 6 is a forward pumping type optical amplifier. On the other hand, the signal light and the pump light propagate in opposite directions in EDF 26 of second-stage optical amplifier 8. In other words, second-stage optical amplifier 8 is a backward pumping type optical amplifier. As a modification, first-stage optical amplifier 6 may be configured as a backward pumping type optical amplifier, and second-stage optical amplifier 8 may be configured as a forward pumping type optical amplifier. Further, each of optical amplifiers 6 and 8 may be configured as a bidirectional pumping type optical amplifier obtained by combining forward pumping and backward pumping.

Figure 8:
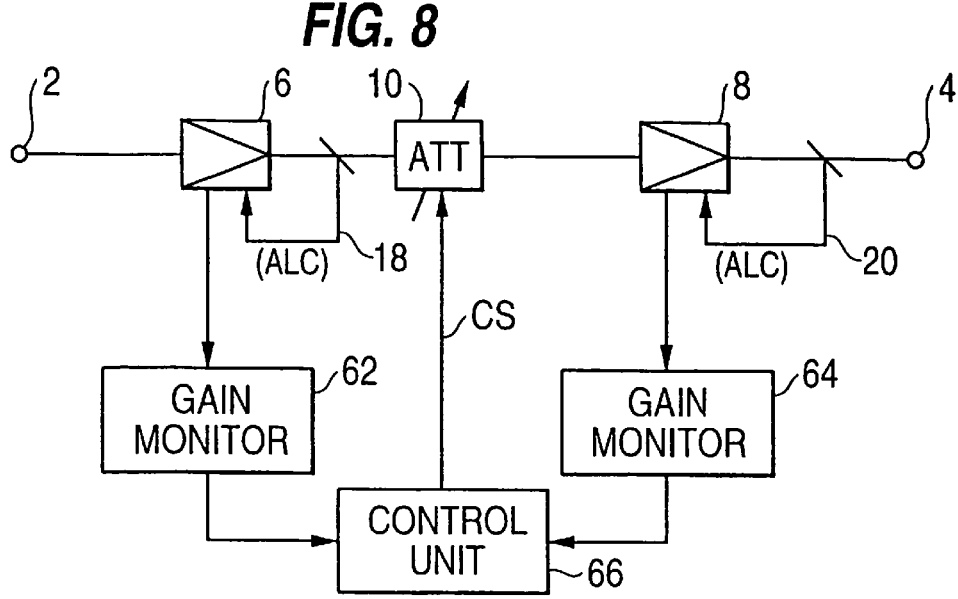
FIG. 8 is a diagram illustrating an optical amplification device, according to an additional embodiment of the present invention.

FIG. 8 is a diagram illustrating an optical amplification device, according to an additional embodiment of the present invention. Referring now to FIG. 8, a control unit 66 connected to gain monitors 62 and 64 controls variable optical attenuator 10. By contrast, in the embodiment shown in FIG. 5, control unit 22 controls variable optical attenuator 10 according to the input level of first-stage optical amplifier 6.

In FIG. 8, gain monitor 62 detects a first gain generated in first-stage optical amplifier 6, and gain monitor 64 detects a second gain generated in second-stage optical amplifier 8. Control unit 66 generates a control signal CS so that the sum of the first and second gains detected by gain monitors 62 and 64 becomes constant, and the control signal CS is supplied to variable optical attenuator 10. Control signal CS controls the variable attenuation of variable optical attenuator 10 to appropriately attenuate the light signal travelling from optical amplifier 6 to optical amplifier 8.

Therefore, in FIG. 8, control unit 66 and variable optical attenuator 10 together operate as a controller which causes the sum of the gains of optical amplifiers 6 and 8 to be constant.

A power diagram as in FIG. 6 can be obtained for the optical amplification device illustrated in FIG. 8. Accordingly, the wavelength characteristic of gain can be maintained constant, and a wide input dynamic range can be obtained. Further, the power of pump light can be suppressed.

With the optical amplification device of FIG. 8, it is apparent that the power diagram satisfying the conditions of the present invention can be obtained even if any one of feedback loops 18 and 20 is omitted. Accordingly, any one of feedback loops 18 and 20 may be omitted. Further, both feedback loops 18 and 20 may be omitted. In the case that each of optical amplifiers 6 and 8 includes an EDF and a pumping light source for supplying pump light to the EDF under the condition where none of feedback loops 18 and 20 are used, it is desirable to add to at least one of optical amplifier 6 and 8 an APC (automatic power control) loop for maintaining the power of the pump light constant or an ACC (automatic current control) loop for maintaining a drive current for the pumping light source constant. The addition of APC or ACC is particularly effective to first-stage optical amplifier 6, so as to achieve many of the objects of the present invention.

FIG. 9 is a diagram illustrating details of the optical amplification device in FIG. 8, according to an embodiment of the present invention. Referring now to FIG. 9, the input level and the output level of first-stage optical amplifier 6 are reflected by output electrical signals from photodetectors 56 and 44, respectively. Accordingly, the gain generated in first-stage optical amplifier 6 can be calculated by a gain calculating circuit 68 according to the ratio or difference in level between the output electrical signals from photodetectors 56 and 44.

To detect the input level of second-stage optical amplifier 8, an optical coupler 69, an optical bandpass filter 70, and a photodetector 72 are provided as respectively corresponding to optical coupler 30, optical bandpass filter 60, and photodetector 56 for first-stage optical amplifier 6. The gain generated in second-stage optical amplifier 8 can be calculated by a gain calculating circuit 74 according to the ratio or difference in level between output electrical signals from photodetectors 72 and 50.

A control circuit 76 (corresponding to control unit 66 in FIG. 8) generates a control signal CS so that the sum of the gains obtained from gain calculating circuits 68 and 74 becomes constant and adjusts the attenuation of variable optical attenuator 10 according to the control signal CS.

The pass band of each of optical bandpass filters 48, 54, 60 and 70 is set so as to include the wavelength of the signal light to be amplified. For example, in the case that the signal light to be amplified is WDM signal light, the pass band of each filter may be set so as to include the wavelength of an optical signal in one channel or may be set so as to include the wavelengths of optical signals in plural channels. Alternatively, the pass band may be set so as to pass ASE in a certain band not including the wavelength of the signal light, because the power of ASE included in this band reflects the gain.

In any case, the pass band of each of optical bandpass filters 48, 54 and 70 is desirably set so as not to include the wavelength of the pump light, so as to avoid the influence of the pump light.

Figure 10:
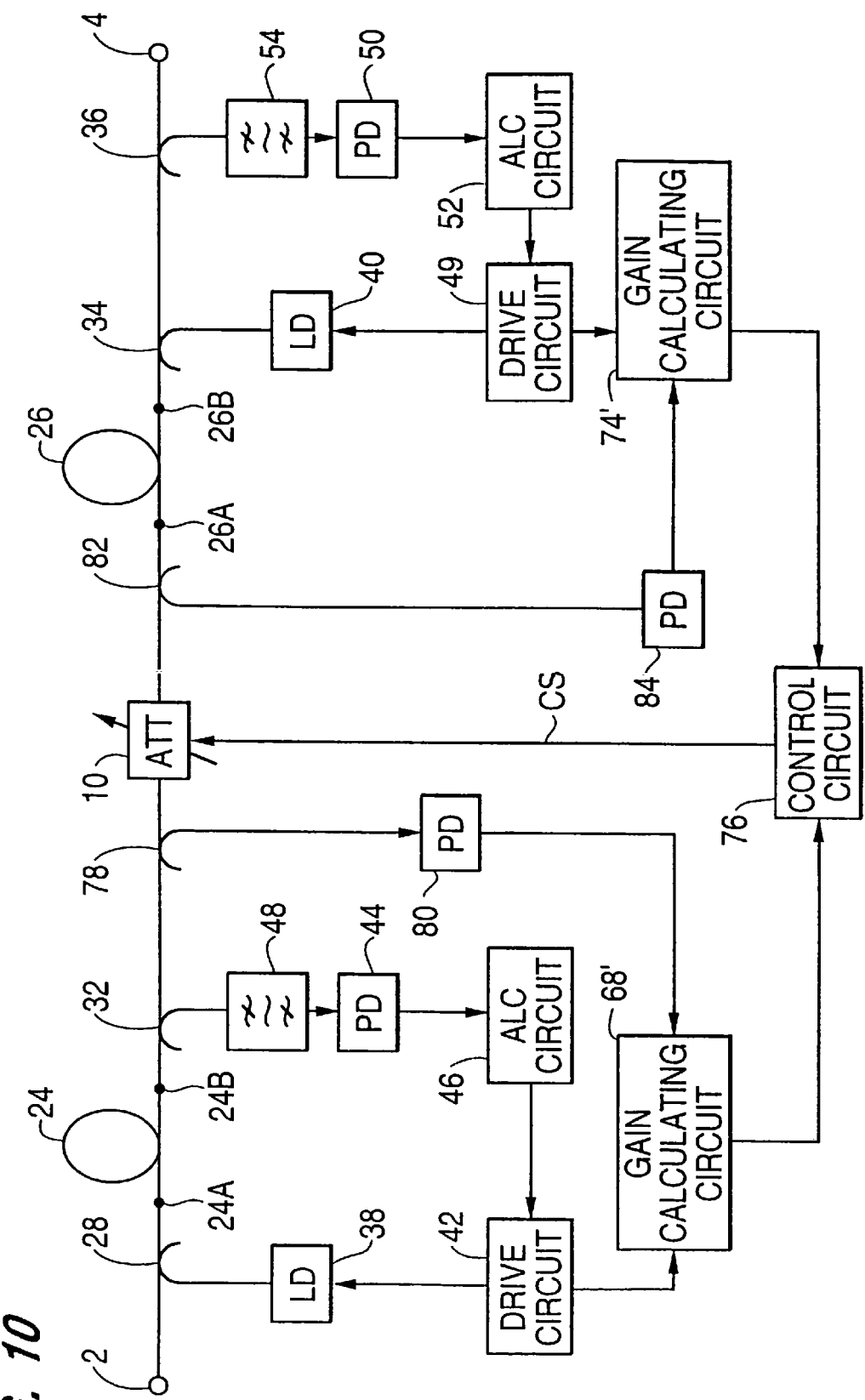
FIG. 10 is a diagram illustrating details of the optical amplification device in FIG. 8, according to an additional embodiment of the present invention.

FIG. 10 is a diagram illustrating details of the optical amplification device in FIG. 8, according to an additional embodiment of the present invention. Referring now to FIG. 10, modified gain calculating circuits 68' and 74' are used to detect the gains of first-stage and second-stage optical amplifiers 6 and 8 according to the absorptance of the pump light in EDFs 24 and 26, respectively.

Of the pump light supplied from laser diode 38 to EDF 24, the residual pump light not absorbed by EDF 24 is branched from a main optical path (an optical path between input port 2 and output port 4) by a WDM coupler 78 provided between optical coupler 32 and variable optical attenuator 10. The residual pump light branched by WDM coupler 78 is supplied to a photodetector 80. Photodetector 80 outputs an electrical signal having a voltage level (or current level) corresponding to the power of the residual pump light received.

The output signal from photodetector 80 reflects the power of the residual pump light. The power of the pump light supplied from laser diode 38 to EDF 24 reflects the drive current supplied from drive circuit 42 to laser diode 38. Accordingly, the absorptance of the pump light in EDF 24 can be obtained according to the output signal from photodetector 80 and a signal from drive circuit 42. Gain calculating circuit 68' calculates the gain generated in EDF 24 according to the absorptance of the pump light obtained. To detect the power of the residual pump light in EDF 26, a WDM coupler 82 and a photodetector 84 are provided as respectively corresponding to WDM coupler 78 and photodetector 80. WDM coupler 82 is optically connected between EDF 26 and variable optical attenuator 10.

Gain calculating circuit 74' can detect the gain generated in EDF 26 according to an output signal from photodetector 84 and a signal from drive circuit 49. Control circuit 76 generates a control signal CS so that the sum of the two gains calculated by gain calculating circuits 68' and 74' becomes constant, thereby maintaining constant the wavelength characteristic of total gain generated in the main optical path.

Figure 11:
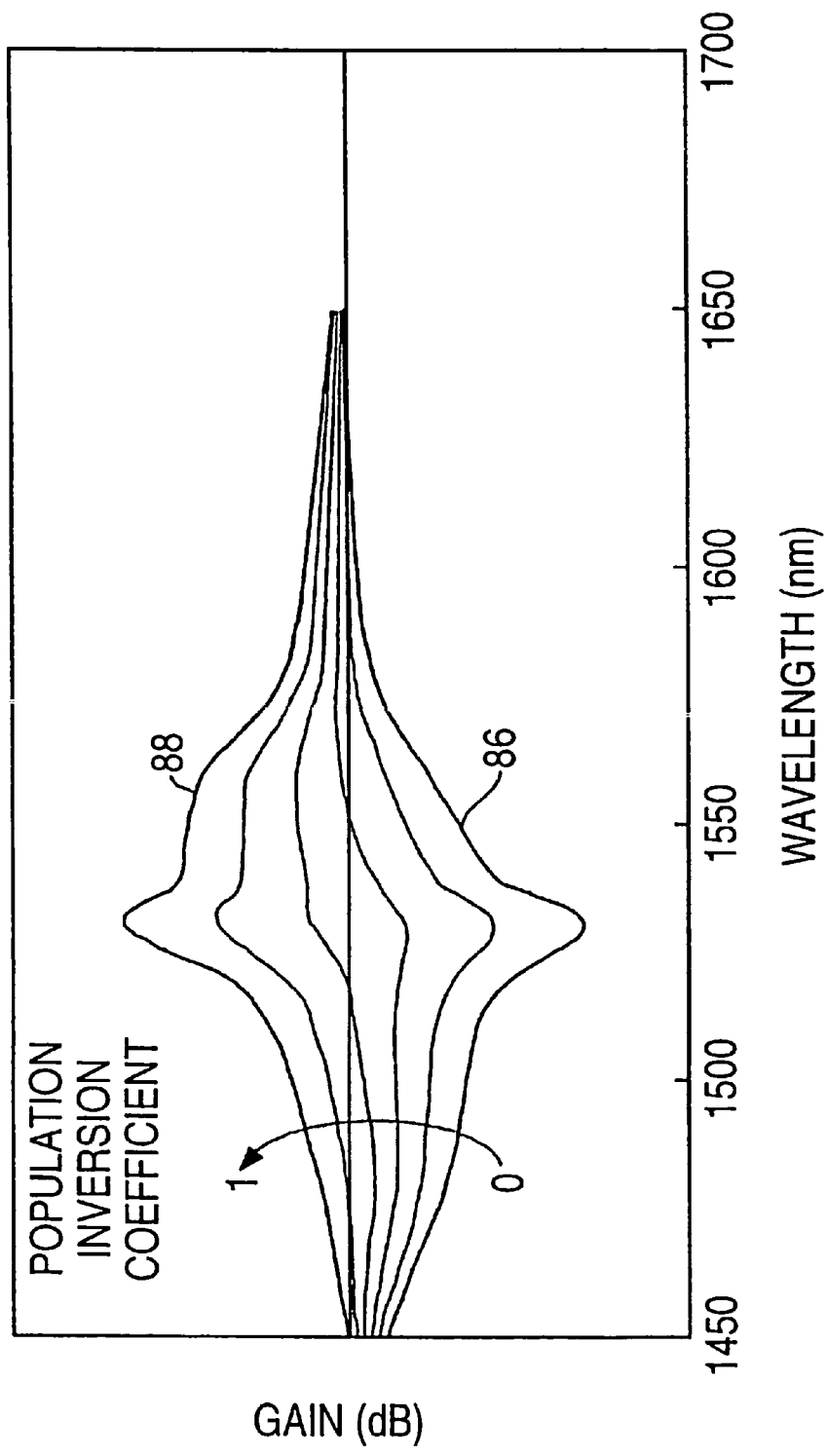
FIG. 11 is a graph illustrating a change in a wavelength characteristic of gain with a change in population inversion coefficient for an EDF.

FIG. 11 is a graph illustrating a change in the wavelength characteristic of gain generated in an EDF with a change in population inversion coefficient (inversion parameter). In FIG. 11, the vertical axis represents gain (dB) or local gain (dB/m), and the horizontal axis represents wavelength (nm). The wavelength characteristic of gain continuously changes from a characteristic shown by reference numeral 86 toward a characteristic shown by reference numeral 88 with an increase in population inversion coefficient from 0 toward 1. The characteristic 86 corresponding to the case where the population inversion coefficient is 0 provides a so-called absorption cross section, whereas the characteristic 88 corresponding to the case where the population inversion coefficient is 1 provides a so-called emission cross section. Accordingly, the gain at a certain wavelength decreases with an increase in absorptance of pump light in an EDF. Thus, the gain generated in an EDF and the absorptance of pump light in the EDF are in a 1:1 correspondence, so that the gain can be calculated according to the absorptance of pump light.

Figure 12:
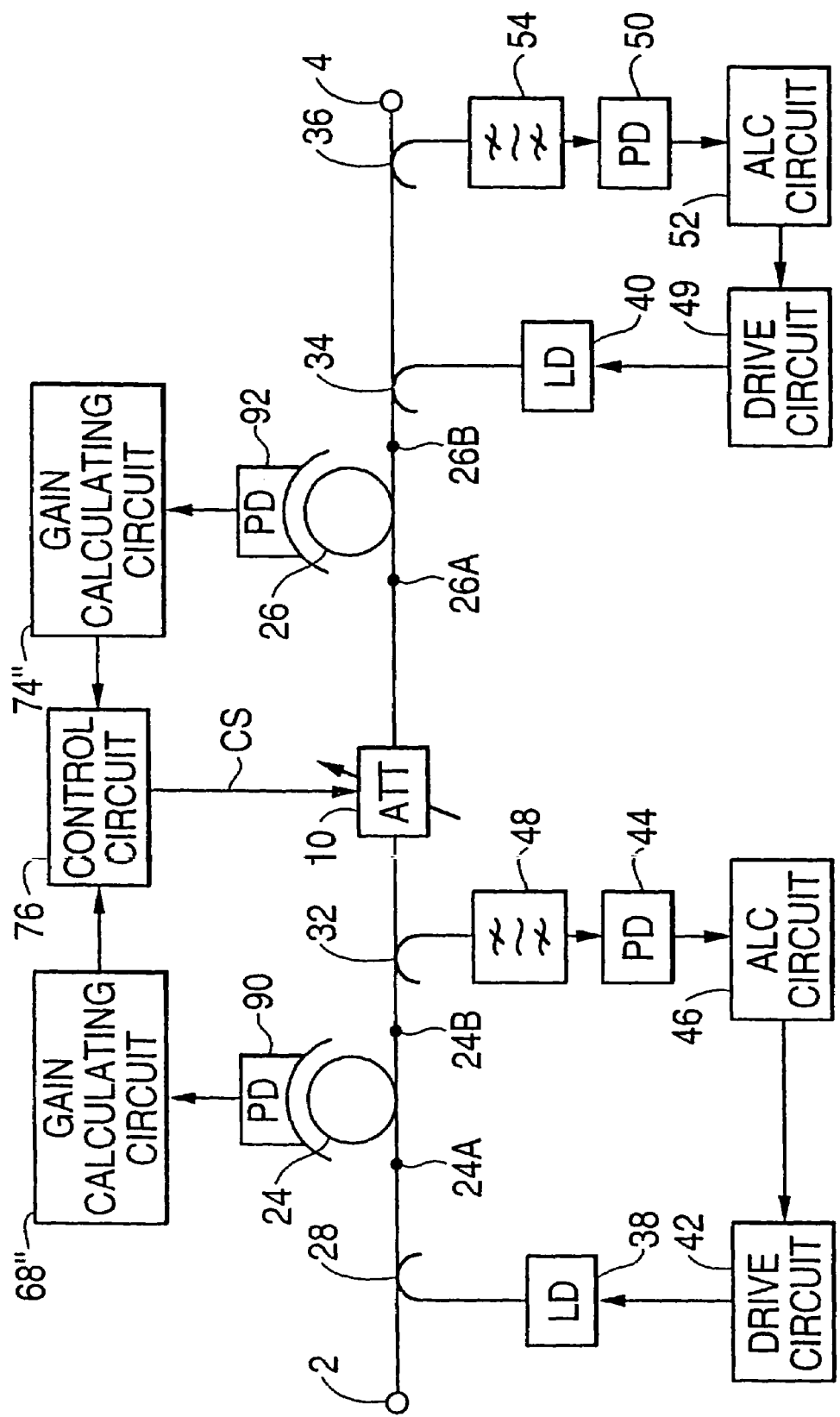
FIG. 12 is a diagram illustrating details of the optical amplification device in FIG. 8, according to a further embodiment of the present invention.

FIG. 12 is a diagram illustrating details of the optical amplification device in FIG. 8, according to a further embodiment of the present invention. Referring now to FIG. 12, the gains generated in EDFs 24 and 26 are detected in accordance with the fact that the gain generated in an EDF is reflected by the power of spontaneous emission light (SE light) emitted sideward from the EDF. To detect the power of spontaneous emission light emitted sideward from EDF 24 over its entire length or at a part thereof, a photodetector 90 is provided in the vicinity of EDF 24. Similarly, to detect the power of spontaneous emission light emitted sideward from EDF 26 over its entire length or at a part thereof, a photodetector 92 is provided in the vicinity of EDF 26.

Gain calculating circuits 68" and 74" calculate the gains generated in EDFs 24 and 26 according to output signals from photodetectors 90 and 92, respectively. Accordingly, control circuit 76 can generate a control signal CS according to output signals from gain calculating circuits 68" and 74" so that the sum of the gains generated in EDFs 24 and 26 becomes constant.

The attenuation of the variable optical attenuator 10 is determined according to the control signal CS, thereby maintaining constant the total sum of the gains generated in the optical path between input port 2 and output port 4. Accordingly, the wavelength characteristic of gain of the device can be maintained constant, and a wide input dynamic range can be obtained. Further, the power of pump light can be suppressed.

In FIG. 12, photodetectors 90 and 92 are used to respectively receive the spontaneous emission light emitted sideward from EDFs 24 and 26. Alternatively, EDFs 24 and 26 may be wound to form the same loop, and a single photodetector may be provided in the vicinity of the loop of EDFs 24 and 26 to detect an optical power corresponding to the sum of the powers of the simultaneous emission light emitted sideward from EDFs 24 and 26. This optical power reflects the sum of the gains generated in EDFs 24 and 26. Accordingly, control circuit 76 may generate a control signal CS according to an output signal from the single photodetector, thereby maintaining constant the total sum of the gains generated in the optical path between input port 2 and output port 4. In this case, one of photodetectors 90 and 92 and one of gain calculating circuits 68" and 74" can be omitted, thereby simplifying the configuration of the device.

Figure 13:
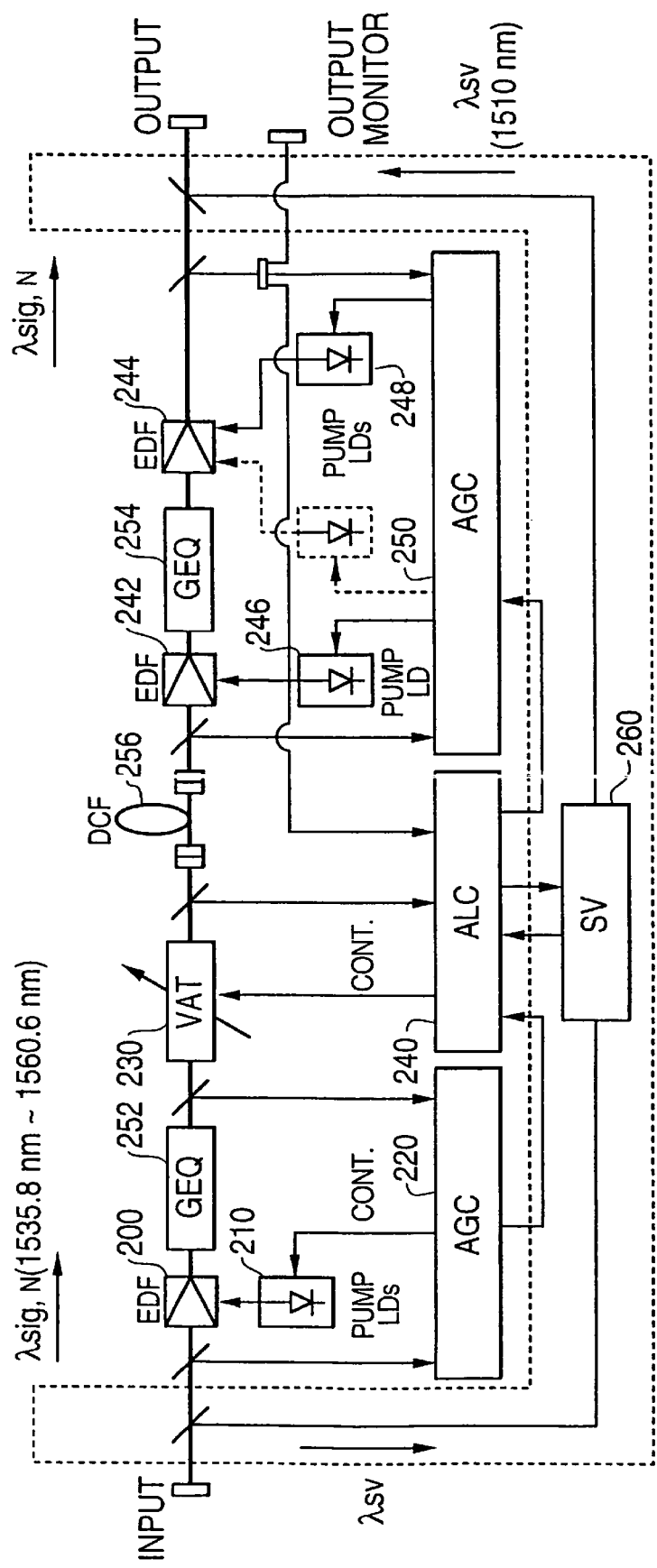
FIG. 13 is a diagram illustrating an optical amplification device, according to a further embodiment of the present invention.

FIG. 13 is a diagram illustrating an optical amplification device, according to a further embodiment of the present invention. More specifically, FIG. 13 illustrates the configuration of a wideband EDFA. Referring now to FIG. 13, an EDF 200 and a pumping light source 210 represent a low-noise preamplifier stage. An automatic gain control (AGC) circuit 220 controls pumping light source 210 to provide automatic gain control. A variable attenuator (VAT) 230 is controlled by an automatic level control (ALC) circuit 240 to appropriately attenuate the output of the preamplifier stage. EDFs 242 and 244 are pumped by pumping light sources 246 and 248, respectively, to provide a post amplifier stage with high output power. An automatic gain control (AGC) circuit 250 controls pumping light sources 246 and 248 to provide automatic gain control. Therefore, AGC is employed in both the preamplifier stage and the post amplifier stage.

Gain equalizers (GEQ) 252 and 254 are utilized to flatten the gain in the entire signal band for the pre-amplifier stage and the post-amplifier stage, respectively. A dispersion compensating fiber (DCF) 256 can be positioned along the transmission line.

A supervisory (SV) circuit extracts supervisory information from a supervisory channel at a supervisory wavelength $\lambda_{SV}$, and uses the extracted information to control ALC circuit 240.

Figure 14A:
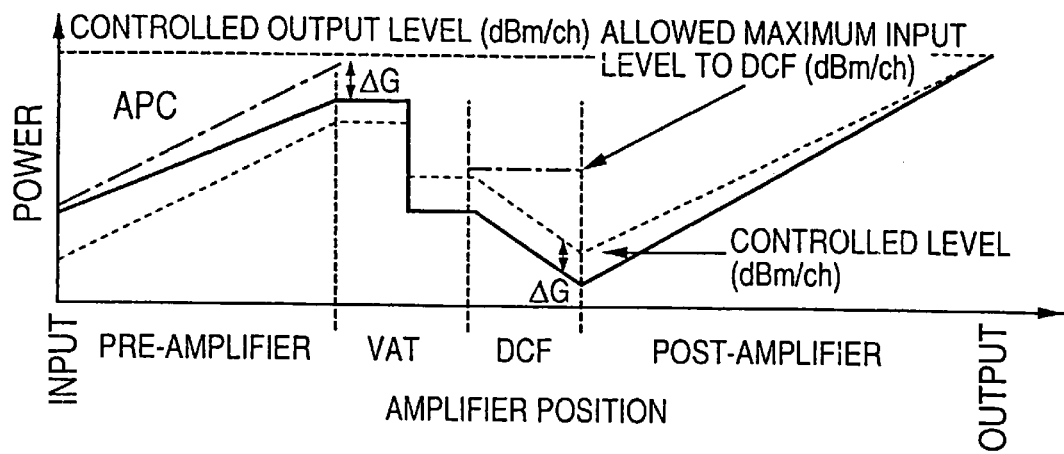
FIGS. 14(A) and 14(B) are diagrams illustrating different operational modes of the optical amplification device in FIG. 13, according to an embodiment of the present invention.
Figure 14B:
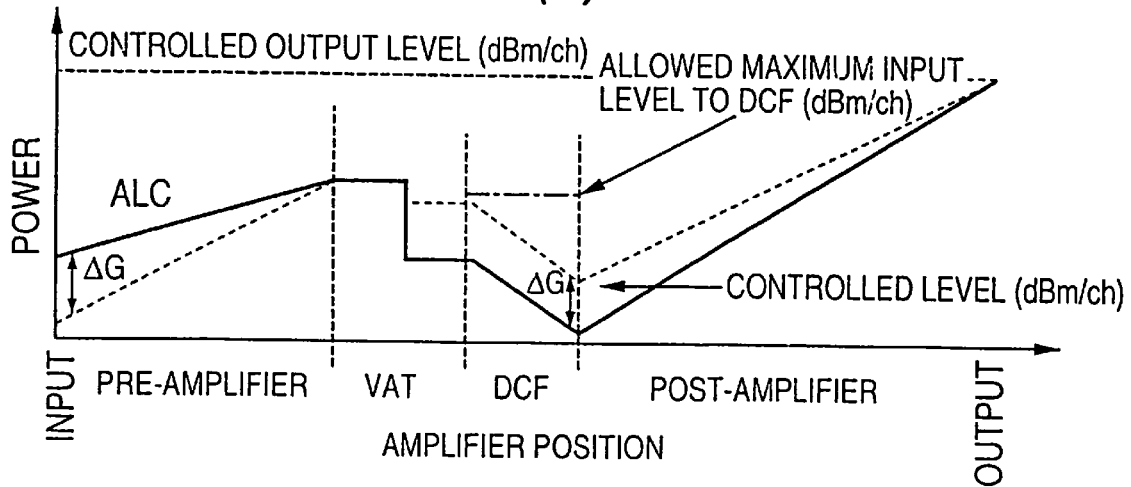

FIGS. 14(A) and 14(B) are diagrams illustrating different operational modes of the optical amplification device in FIG. 13, according to an embodiment of the present invention. Referring now to FIG. 14(A), with this operational mode, the preamplifier stage employs automatic power control (APC) provided by AGC circuit 220. As shown in FIG. 14(A), the decreasing amount of the preamplifier stage gain ΔG is added to the gain of the postamplifier stage by controlling variable attenuator 230 to keep the total gain constant.

As shown in FIG. 14(B), with this operational mode, the preamplifier stage employs automatic level control (ALC). As shown in FIG. 14(B), the decreasing amount of the preamplifier stage gain AG is added to the gain of the postamplifier stage by controlling variable attenuator 230 to keep the total gain constant.

Figure 15:
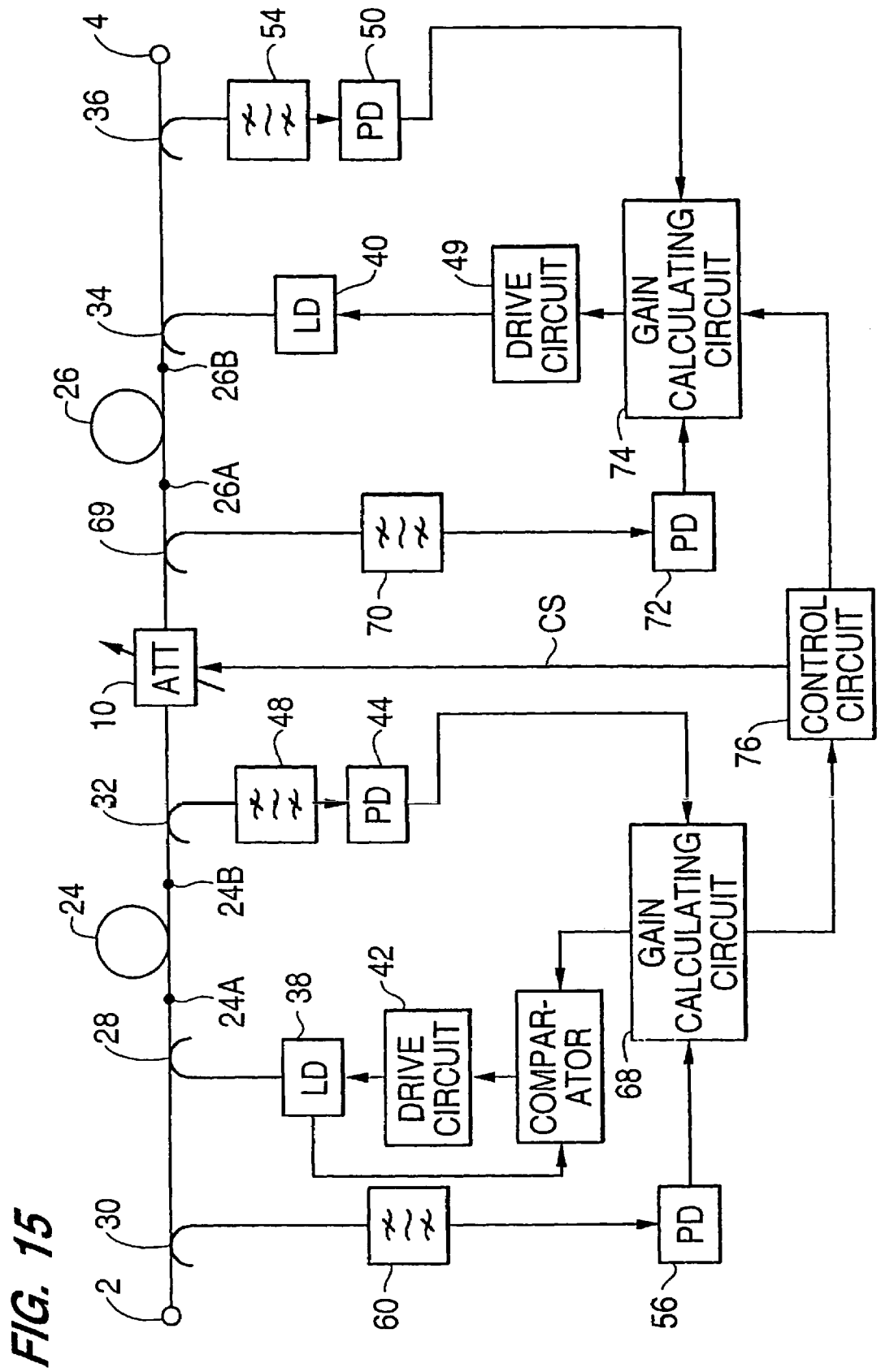
FIG. 15 is a diagram illustrating an optical amplification device, according to an additional embodiment of the present invention.

FIG. 15 is a diagram illustrating an optical amplification device according to an additional embodiment of the present invention.

Various of the above embodiments of the present invention relate to two optical amplifiers cascaded together. However, the present invention is applicable to configurations where three or more optical amplifiers are cascaded together.

Moreover, according to the above embodiments of the present invention, an optical attenuator is positioned between optical amplifiers. However, the present invention is applicable to configurations where more than one optical attenuator is positioned between optical amplifiers, and to configurations with more than two optical amplifiers cascaded together, and optical attenuators positioned at various locations amongst the cascaded optical amplifiers.

According to the above embodiments of the present invention, it is possible to provide a method and device for optical amplification and a novel system including the device which can maintain the wavelength characteristic of gain constant, can obtain a wide input dynamic range, and can suppress the power of pump light.

According to the above embodiments of the present invention, a variable optical attenuator is positioned between first and second optical amplifiers. The first and second optical amplifiers can each be provided with an ALC feedback loop, for maintain output levels at a constant value. The input level of the first optical amplifier is detected, and the variable optical attenuator is controlled so that, when the input level of the first optical amplifier changes by Δ (dBm in unit), the input level of the second optical amplifier changes by approximately −Δ.

Therefore, as indicated above, according to various embodiments of the present invention, when the input level of a first optical amplifier changes by Δ, the input level of a second optical amplifier changes by approximately −Δ. For example, to change by approximately −Δ, the input level of the second optical amplifier should preferably change by −(Δ±Δ/20). However, a change of approximately −Δ is not intended to be limited to this preferable range, and other ranges may be sufficient to provide sufficient operation.

According to the above embodiments of the present invention, a variable optical attenuator is positioned between first and second optical amplifiers. The variable optical attenuation provides a variable attenuation in accordance with a control signal supplied thereto. A first gain monitor detects the gain of the first optical amplifier and a second gain monitor detects the gain of the second optical amplifier. The variable optical attenuator is controlled so that the sum of the detected gains of the first and second optical amplifiers becomes constant.

Various optical amplification devices for use in WDM optical communication systems are described above. Japanese Patent Laid-open Nos. Hei. 8-248455 and Hei. 10-51057, filed by the Applicants, disclose additional optical amplification devices for use in WDM optical communication systems. In these optical amplification devices, WDM signal light obtained by multiplexing a plurality of optical signals having different wavelengths is subjected to batch amplification by two-stage amplifier sections each employing, for example, an erbium doped fiber (EDF). In the batch amplification, AGC is performed to control the gain in each of the front-stage and rear-stage amplifier sections to be constant. By this control, the wavelength dependence of gain (which will be hereinafter referred to as gain-wavelength characteristic) of each EDFA can be maintained constant even when input light power changes. By effectively compensating for the gain-wavelength characteristic of the optical amplifier, WDM signal light whose channels are equalized in level can be obtained. Further, there has been proposed another optical amplification device which can obtain stable amplifying characteristics in the case that the number of wavelengths (the number of channels) included in WDM signal light is changed.

In such optical amplification devices, a large-capacity pumping source must be used to realize constant gain control. In general, the power level of WDM signal light per wavelength (per channel) input to the optical amplification device is not a fixed value, but is varied. To control the gain to be constant against such variations in input light level, the power of pump light must be controlled substantially exponentially. Accordingly, it is necessary to provide a relatively large-capacity pumping source which can support such exponential control.

While the optical amplification device is required to have a required input dynamic range supporting variations in input light level, it is also required to output WDM signal light whose channels are equalized in level. For example, this requirement is met by a proposed method for controlling an optical attenuation so that the output light level per channel becomes constant by providing a variable optical attenuator between the front-stage and rear-stage amplifier sections of the optical amplification device.

In this case, the gain of the front-stage amplifier section is set so that the level of output light from the front-stage amplifier section becomes a constant value or more when the input light level is minimum. Accordingly, also when the input light level is high, the amplification with the above set gain is carried out and thereafter the amplified signal light is attenuated to a given level by the variable optical attenuator. Therefore, when the input light level is high, excess optical amplification is performed in the front-stage amplifier section to realize AGC. Providing a costly high-capacity pumping source to allow such excess optical amplification is a disadvantage from the viewpoint of cost reduction of the optical amplification device.

Further, in an optical amplification device (such as an optical amplifier) having a two-stage amplifying configuration, it is effective to set the gain of the front-stage amplifier section to a high value in reducing a noise figure (NF). However, realization of this setting also requires providing a large-capacity pumping source. That is, setting the gain to a high value in the case of a low input light level can be relatively easily realized also by using a normal-capacity pumping source. However, when the input light level is increased under AGC with the gain being set to a high value, the power of pump light by the normal-capacity pumping source becomes lacking to cause a possibility that the AGC does not effectively function. For this reason, the large-capacity pumping source is required.

Thus, such an optical amplification device applied to a WDM optical communication system has a problem that an excess power of pump light is required in the front-stage amplifier section, so as to ensure a required input dynamic range supporting variations in input light level, to equalize the levels of all channels of output light, and to improve noise characteristics.

Figure 16:
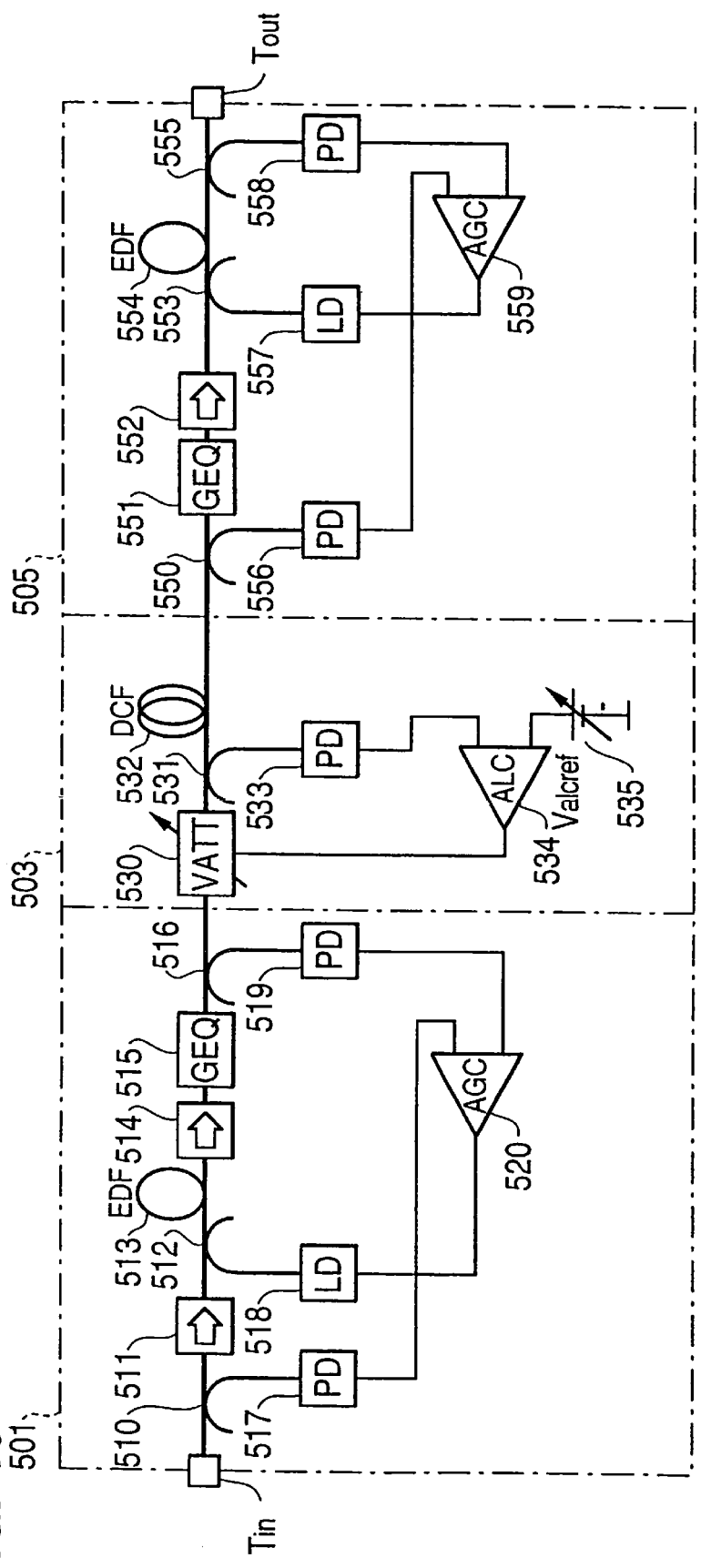
FIG. 16 is a diagram illustrating an optical amplification device.

FIG. 16 is a diagram illustrating an optical amplification device applicable to a WDM optical transmission system.

Referring now to FIG. 16, the optical amplification device has a two-stage amplification configuration including a front-stage amplifier section 501 amplifying WDM signal light input to an input terminal Tin, a middle-stage ALC section 503 connected to an output end of front-stage amplifier section 501, and a rear-stage amplifier section 505 amplifying WDM signal light passed through middle stage ALC section 503 and outputting amplified WDM signal light from an output terminal Tout.

In front-stage amplifier section 501, the WDM signal light input to the input terminal Tin is supplied through a beam splitter 510, an optical isolator 511, and a WDM coupler 512 to an erbium doped fiber (EDF) 513. Pump light is emitted from a pumping source (LD) 518 and supplied through WDM coupler 512 to EDF 513 from its front end. Thus, EDF 513 is forward pumped by the pump light.

The drive condition of pumping source 518 is controlled according to a signal from an AGC circuit 520. More specifically, a part of the WDM signal light to be supplied to EDF 513 and a part of the amplified WDM signal light output from EDF 513 are respectively extracted by beam splitters 510 and 516 and respectively converted into electrical signals by photodetectors (PD) 517 and 519. These electrical signals from photodetectors 517 and 519 are input to AGC circuit 520. In AGC circuit 520, an actual gain is obtained according to the input signals from photodetectors 517 and 519, and a signal for controlling the drive condition of pumping source 518 so that the actual gain becomes constant is generated.

Figure 17:
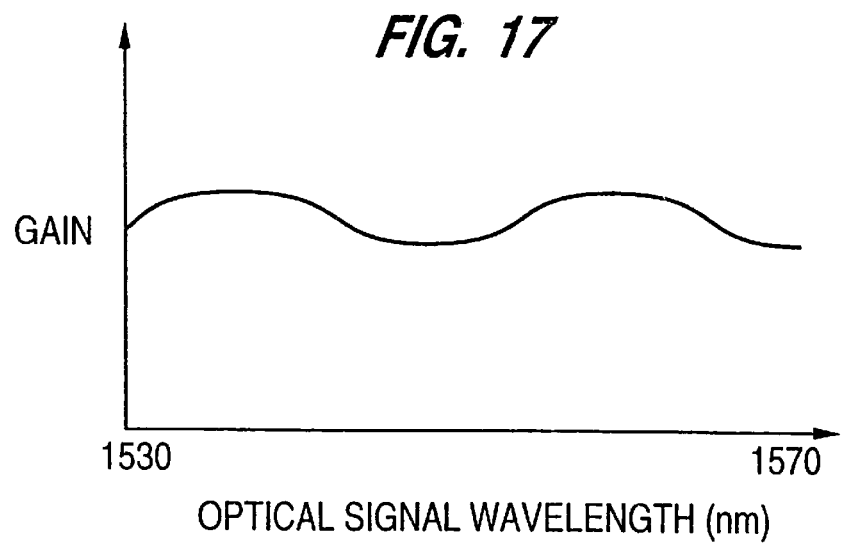
FIG. 17 is a graph illustrating a gain-wavelength characteristic of an EDF at a set gain.
Figure 18:
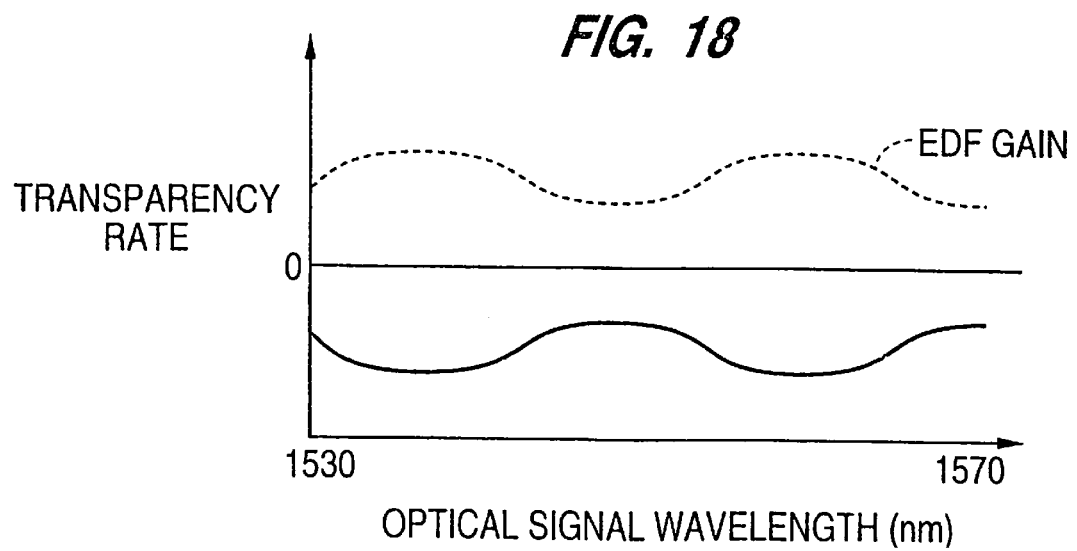
FIG. 18 is a graph illustrating a transmission characteristic of a gain equalizer corresponding to the gain-wavelength characteristic shown in FIG. 17.

Thus, the gain by EDF 513 is controlled to be constant, and the WDM signal light is input into EDF 513 and passed therethrough, thereby amplifying the WDM signal light. The WDM signal light amplified by EDF 513 is supplied through an optical isolator 514 to a gain equalizer (GEQ) 515. Gain equalizer 515 is an optical filter for compensating for a gain-wavelength characteristic of EDF 513. More specifically, in the case that EDF 513 has a gain-wavelength characteristic at a predetermined gain as shown in FIG. 17, an optical filter having a transmittance-wavelength characteristic as shown by a solid line in FIG. 18 may be used as gain equalizer 515. The WDM signal light passed through gain equalizer 515 is supplied through beam splitter 516 to middle-stage ALC section 503.

In middle ALC section 503, the WDM signal light from front-stage amplifier section 501 is supplied to a variable optical attenuator (VATT) 530 as a level adjusting device. An optical attenuation by variable optical attenuator 530 is controlled according to a signal from an ALC circuit 534. More specifically, a part of the WDM signal light output from variable optical attenuator 530 is extracted by a beam splitter 531 and converted into an electrical signal by a photodetector 533. This electrical signal is input to ALC circuit 534. In ALC circuit 534, a signal for controlling the optical attenuation by variable optical attenuator 530 so that the level of the WDM signal light per channel to be output from variable optical attenuator 530 becomes constant is generated according to a result of comparison between an ALC reference value (Valcref) supplied from a reference value generating circuit 535 and the signal supplied from photodetector 533.

Although not shown, information on the number of wavelengths (the number of channels) of the WDM signal light is given to reference value generating circuit 535 from the outside thereof, and the ALC reference value is output so as to support a change in the number of channels.

The WDM signal light output from variable optical attenuator 530 is supplied through a beam splitter 531 to a dispersion compensating fiber (DCF) 532. Dispersion compensating fiber 532 functions to compensate for a chromatic dispersion characteristic of an optical transmission line connected to the optical amplification device. However, in the case that no dispersion compensation is required, dispersion compensating fiber 532 may be omitted. The WDM signal light passed through dispersion compensating fiber 532 is supplied to rear-stage amplifier section 505.

In rear-stage amplifier section 505, the WDM signal light from middle-stage ALC section 503 is supplied through a beam splitter 550, a gain equalizer 551, an optical isolator 552, and a WDM coupler 553 to an EDF 554. Similar to gain equalizer 515 in front-stage amplifier section 501, gain equalizer 551 is an optical filter for compensating for a gain-wavelength characteristic of EDF 554 at a predetermined gain. Pump light emitted from a pumping source 557 is supplied through WDM coupler 553 to EDF 554 from its front end, thereby forward pumping EDF 554.

The drive condition of pumping source 557 is controlled according to a signal from an AGC circuit 559. More specifically, a part of the WDM signal light to be input to EDF 554 and a part of the amplified WDM signal output from EDF 554 are respectively extracted by beam splitters 550 and 555 and respectively converted into electrical signals by photodetectors 556 and 558. These electrical signals from photodetectors 556 and 558 are input to AGC circuit 559. In AGC circuit 559, an actual gain is obtained according to the input signals from photodetectors 556 and 558, and a signal for controlling the drive condition of pumping source 557 so that the actual gain becomes constant is generated. Thus, the gain by EDF 554 is controlled to be constant, and the WDM signal light is input into EDF 554 and passed therethrough, thereby amplifying the WDM signal light. The WDM signal light amplified by EDF 554 is passed through beam splitter 555 and output from the output terminal Tout of this optical amplifier.

EDFs 513 and 554, pumping sources 518 and 557, and WDM couplers 512 and 553 in front-stage and rear-stage amplifier sections 501 and 505 function as an example of an optical amplifying device. Further, AGC circuits 520 and 559, photodetectors 517, 519, 556, and 558, and beam splitters 510, 516, 550, and 555 in front-stage and rear-stage amplifier sections 501 and 505 function as examples of a constant gain control devices. Further, gain equalizers 515 and 551 in front-stage and rear-stage amplifier sections 501 and 505 function as examples of gain-wavelength characteristic compensating devices. Further, ALC circuit 534, beam splitter 531, photodetector 533, and reference value generating circuit 535 in middle-stage ALC section 503 function as examples of a constant level control device.

AGC is performed in each of front-stage amplifier section 501 and rear-stage amplifier section 505 according to detected levels of the WDM signal light on the upstream and downstream sides of the corresponding EDF. As a modification, AGC may be performed by detecting amplified spontaneous emission (ASE) generated in each EDF and determining the gain by each EDF according to a detected level of the ASE. Further, while forward pumping is performed in each of front-stage amplifier section 501 and rear-stage amplifier section 505, backward pumping or bidirectional pumping may be performed in each amplifier section.

Figure 19:
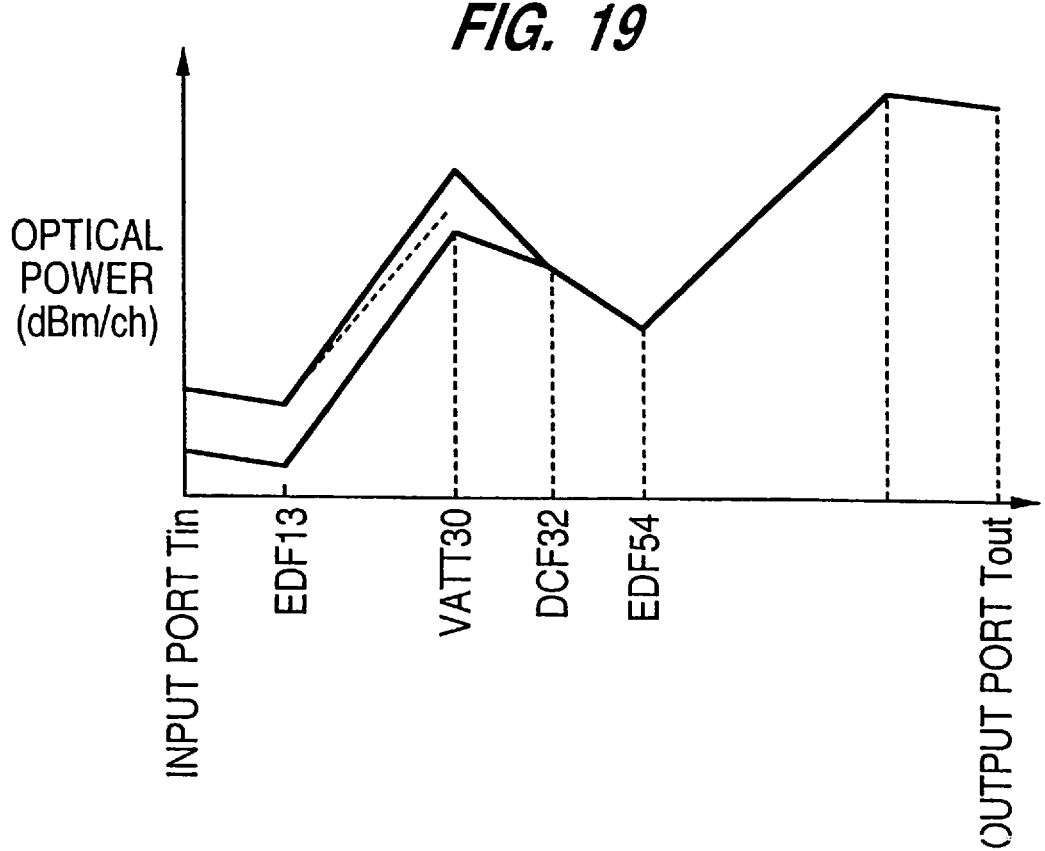
FIG. 19 is a graph illustrating changes in power level of WDM signal light per channel propagating in the optical amplification device in FIG. 16.

FIG. 19 is a graph illustrating changes in power level of the WDM signal light per channel propagating in the optical amplification device of FIG. 16. As shown in FIG. 19, although there is a change in input level per channel input to the optical amplifier, the level of the WDM signal light per channel is controlled to be constant in middle-stage ALC section 503. Accordingly, the level of the WDM signal light per channel amplified under the constant gain control in rear-stage amplifier section 505 is also maintained constant.

To ensure a required input dynamic range and maintain AGC for front-stage amplifier section 501, pumping source 518 must be able to supply pump light having a high power to EDF 513. In the case that pumping source 518 cannot supply pump light having a power enough to maintain a set gain for high-level input light as shown by a broken line in FIG. 19, the gain by EDF 13 becomes low to result in a change in the gain-wavelength characteristic shown in FIG. 17. If the gain-wavelength characteristic of EDF 513 changes, the compensation by gain equalizer 515 does not effectively function, and as a result, the level of the WDM signal light per channel output from the optical amplifier cannot be maintained constant.

A change in the gain-wavelength characteristic of an EDF will now be described in brief.

Figure 20:
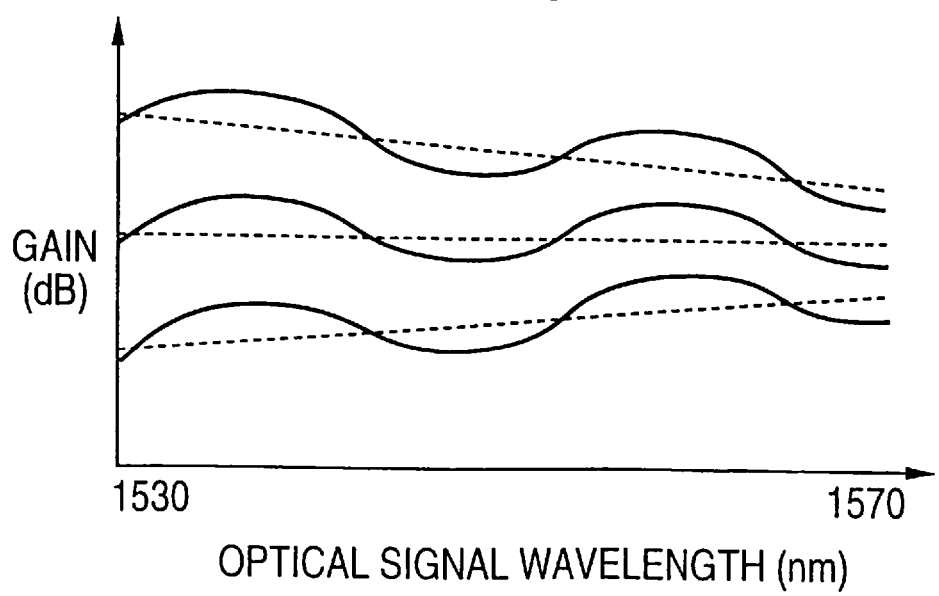
FIG. 20 is a graph illustrating an example of the gain-wavelength characteristic of an EDF when the gain changes.

FIG. 20 is a graph illustrating an example of changes in the gain-wavelength characteristic of an EDF with changes in the gain of the EDF. In the example shown in FIG. 20, the gain-wavelength characteristic has a negative tilt such that the gain decreases with an increase in wavelength when the gain of the EDF is higher, whereas the gain-wavelength characteristic has a positive tilt such that the gain increases with an increase in wavelength when the gain of the EDF is lower. In this manner, it has been confirmed that the gain-wavelength characteristic of an EDF is such that the gain tilt changes from a positive tilt to a negative tilt with an increase in the gain of the EDF, i.e., an increase in pump energy. Further, it has been reported that the gain tilt also changes according to an input light level or an EDF length (e.g., Y. Nakabayashi et al., "Flattening of multi-wavelength batch amplification of optical fiber amplifier using fiber amplification factor control", ShingakuGiho, OCS94-66; S. Yoshida et al., "Wavelength multiplexed signal common amplification characteristics of high-concentration Al codoped EDFA", ShingakuGiho, OCS95-9; Y, Sugaya et al., "A study of configuration method for wavelength multiplexing Er-doped fiber optical amplifier", ShingakuGiho).

In FIG. 16, pumping source 518 having a relatively large capacity is required to maintain the constant gain control of front-stage amplifier section 501, causing an increase in cost of the optical amplifier.

Noise characteristics of the optical amplification device in FIG. 16 will now be described. The noise figure (NF) of the optical amplifier as a whole can be calculated in accordance with the following Equation (1).

$$NF[\text{dB}] = LOSSf + 10 \times \log\{10^{NFf/10} + (10^{LOSSm/10} + 10^{NFr/10})/10^{Gf/10}\} \quad \text{Equation (1)}$$

where LOSSf is the loss on the upstream side of EDF 513, NFf is the noise figure of EDF 513, LOSSm is the loss on the downstream side of EDF 513 and on the upstream side of EDF 554 (the loss in the middle portion of the optical amplifier), NFr is the noise figure of EDF 554, and Gf is the gain of EDF 513. In the case that LOSSf=2 dB, NFf=4 dB, LOSSm=15 dB, NFr=6 dB, and Gf=15 dB, the noise figure of the optical amplifier as a whole is calculated to NF=7.61 dB from Equation (1).

As apparent from Equation (1), the losses LOSSf and LOSSm or the noise figures NFf and NFr must be decreased or the gain Gf must be increased to reduce the noise figure NF of the optical amplifier as a whole. However, decreasing the losses LOSSf and LOSSm or the noise figures NFf and NFr is limited because they depend on the characteristics of the respective devices. On the other hand, increasing the gain Gf can be realized by increasing the power of the pump light to be supplied to EDF 513. In particular, when the level of signal light input to the optical amplifier becomes low, a small value of the noise figure NF of the optical amplifier must be ensured for the purpose of increasing an S/N ratio at a receiving end.

In the case that the level of input light is low, the noise figure NF can be relatively easily reduced by increasing the gain Gf of EDF 513, because not so high pump light power is required. However, the gain Gf of EDF 513 must be controlled to be constant because the gain-wavelength characteristic of EDF 513 must be compensated by gain equalizer 515. Accordingly, although the noise figure NF can be reduced by setting the gain Gf of EDF 513 to a high value in the case that the level of input light is low, there is a possibility that when the level of input light becomes high, the pump light power may lack to cause a problem that AGC is not effected and there occurs a difference in level of output light between channels.

Consequently, as far as the optical amplification device in FIG. 16 is required to have a required input dynamic range, the power of pump light to be supplied to EDF 513 must be increased to increase the gain Gf for the purpose of reducing the noise figure NF.

In these circumstances, according to embodiments of the present invention as will be discussed in more detail below, an optical amplification device (such as an optical amplifier) for WDM has been achieved by improving the configuration in FIG. 16 to thereby ensure a required input dynamic range and allow effective compensation for the gain-wavelength characteristic of the EDF and a reduction in the noise figure NF without restriction by AGC.

Figure 21:
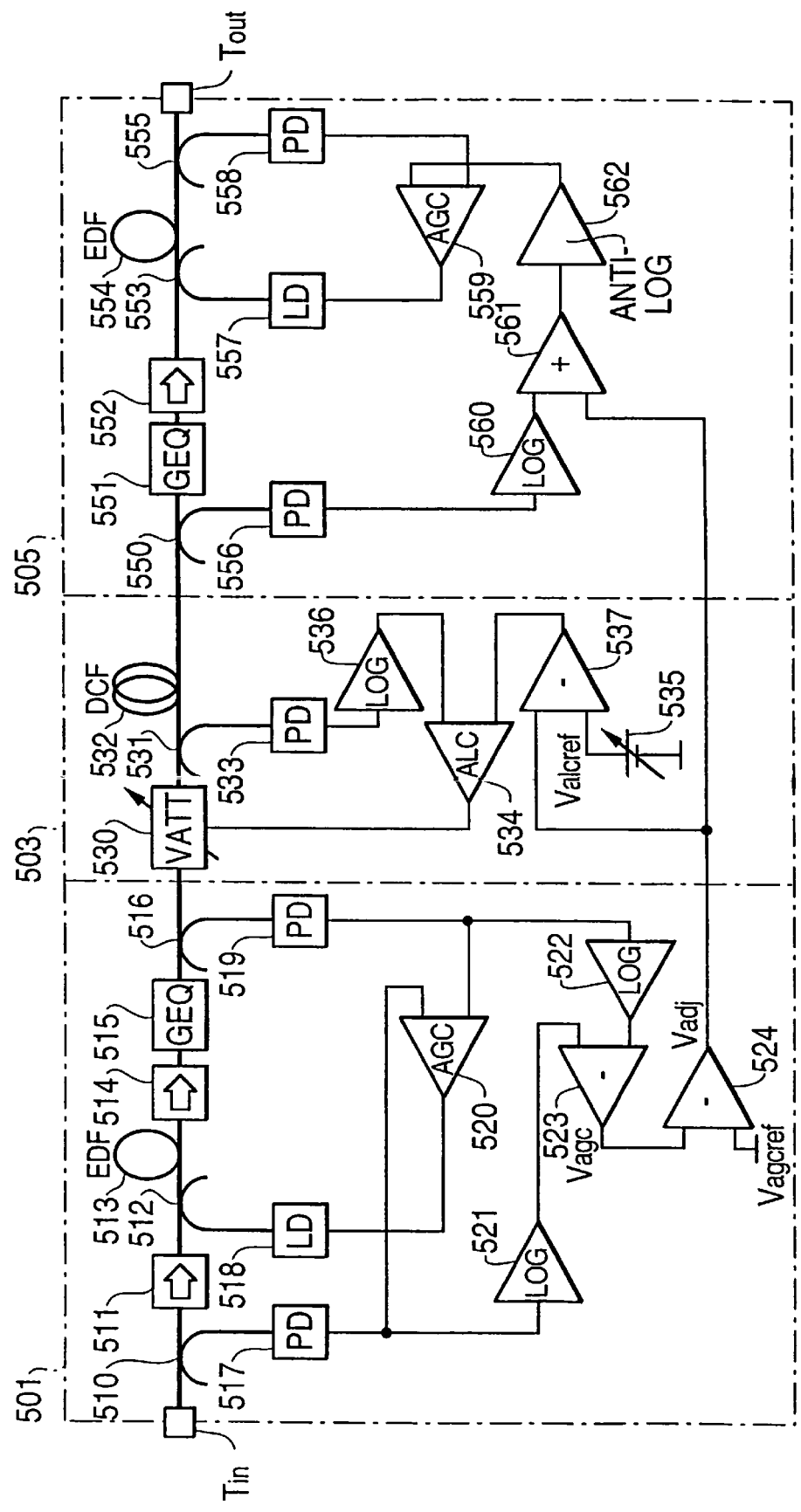
FIG. 21 is a diagram illustrating an optical amplification device for use in a WDM optical communication system, according to an embodiment of the present invention.

FIG. 21 is a diagram illustrating an optical amplification device according to an embodiment of the present invention. In FIG. 21, substantially the same parts as those of the optical amplification device in FIG. 16 are denoted by the same reference numerals.

The optical amplification device shown in FIG. 21 has been improved over the configuration shown in FIG. 16 by detecting a change in gain of front-stage amplifier section 501, making the ALC reference value in middle-stage ALC section 503 changeable according to the detected change in gain, and making the set gain in rear-stage amplifier section 505 changeable according to the detected change in gain. These improvements can eliminate the need for use of a large-capacity pumping source as pumping source 518 in front-stage amplifier section 501. More specifically, the configuration of the optical amplification device in FIG. 21 is different from the configuration in FIG. 16 in that front-stage amplifier section 501 further includes log transformers (LOG) 521 and 522 and subtracters (−) 523 and 524, in that middle-stage ALC section 503 further includes a log transformer 536 and a subtracter 537, and in that rear-stage amplifier section 505 further includes a log transformer 560, an adder 561, and an anti-log transformer 562.

In this embodiment of the present invention, log transformers 521 and 522 and subtracter 523 function as an example of a gain measuring device, and subtracter 524 functions as an example of a gain deviation computing device. Further, subtracter 537 functions as an example of a reference level changing device, and log transformer 560, adder 561, and anti-log transformer 562 function as an example of a reference gain changing device.

Input terminals of log transformers 521 and 522 in front-stage amplifier section 501 are connected to output terminals of photodetectors 517 and 519, respectively, so that log transformers 521 and 522 respectively receive electrical signals from photodetectors 517 and 519 and transform the voltage levels of the electrical signals into logarithmic values, which are in turn supplied to subtracter 523. Subtracter 523 subtracts the level of the output signal from log transformer 521 from the level of the output signal from log transformer 522 to obtain a voltage value Vagc corresponding to the gain of EDF 513, which is in turn supplied to subtracter 524. Subtracter 524 subtracts the voltage value Vagc output from subtracter 523 from a predetermined gain reference value Vagcref to obtain a gain correction value Vadj, which is in turn supplied to middle-stage ALC section 503 and rear-stage amplifier section 505.

An input terminal of log transformer 536 in middle-stage ALC section 503 is connected to an output terminal of photodetector 533, so that log transformer 536 receives an electrical signal from photodetector 533 and transforms a voltage level of the electrical signal into a logarithmic value, which is in turn supplied to one of two input terminals of ALC circuit 534. Subtracter 537 receives the gain correction value Vadj from subtracter 524 in front-stage amplifier section 501 and an ALC reference value Valcref from reference value generating circuit 535, and subtracts the gain correction value Vadj from the ALC reference value Valcref to obtain a new ALC reference value Valcref', which is in turn supplied to the other input terminal of ALC circuit 534. ALC circuit 534 controls the optical attenuation of variable optical attenuator 530 according to the new ALC reference value Valcref' so that the level of the WDM signal light per channel becomes constant.

An input terminal of log transformer 560 in rear-stage amplifier section 505 is connected to an output terminal of photodetector 556, so that log transformer 560 receives an electrical signal from photodetector 556 and transforms a voltage level of the electrical signal into a logarithmic value, which is in turn supplied to adder 561. Adder 561 adds the gain correction value Vadj from subtracter 524 in front-stage amplifier section 501 to the voltage value output from log transformer 560 to obtain a sum, which is in turn supplied to anti-log transformer 562. Anti-log transformer 562 transforms the logarithmic voltage value output from adder 561 into an anti-logarithmic value, which is in turn supplied to one of two input terminals of AGC circuit 559. AGC circuit 559 controls the gain of EDF 554 to be constant according to the signal from anti-log transformer 562 and the signal from photodetector 558.

Therefore, in FIG. 21, log transformer 521, log transformer 522, subtracter 523, subtracter 524, log transformer 560, adder 561 and anti-log transformer 562 together operate as a gain adjustor which detects a deviation in gain of front-stage amplifier section 501 from a target (or reference) gain, and adjusts the gain of rear-stage amplifier section 505 to compensate for the detected deviation. However, the use of such log transformers, subtracters and anti-log transformers represents only one embodiment of such a gain adjustor, and modifications and other designs for a gain adjustor can easily be implemented.

Moreover, in FIG. 21, log transformer 521, log transformer 522, subtracter 523, subtracter 524 and subtracter 537 together operate as a level controller which controls a level of the light amplified by front-stage amplifier section 501 before being amplified by rear-stage amplifier section 505 to be at a target level. The level controller adjusts the target level to compensate for a detected deviation in gain of front-stage amplifier section 501 from a reference gain. However, the use of such log transformers and subtracters represents only one embodiment of such a level controller, and modifications and other designs for a level adjuster can easily be implemented.

The operation of the optical amplification device in FIG. 21 will now be described in more detail.

Figure 22:
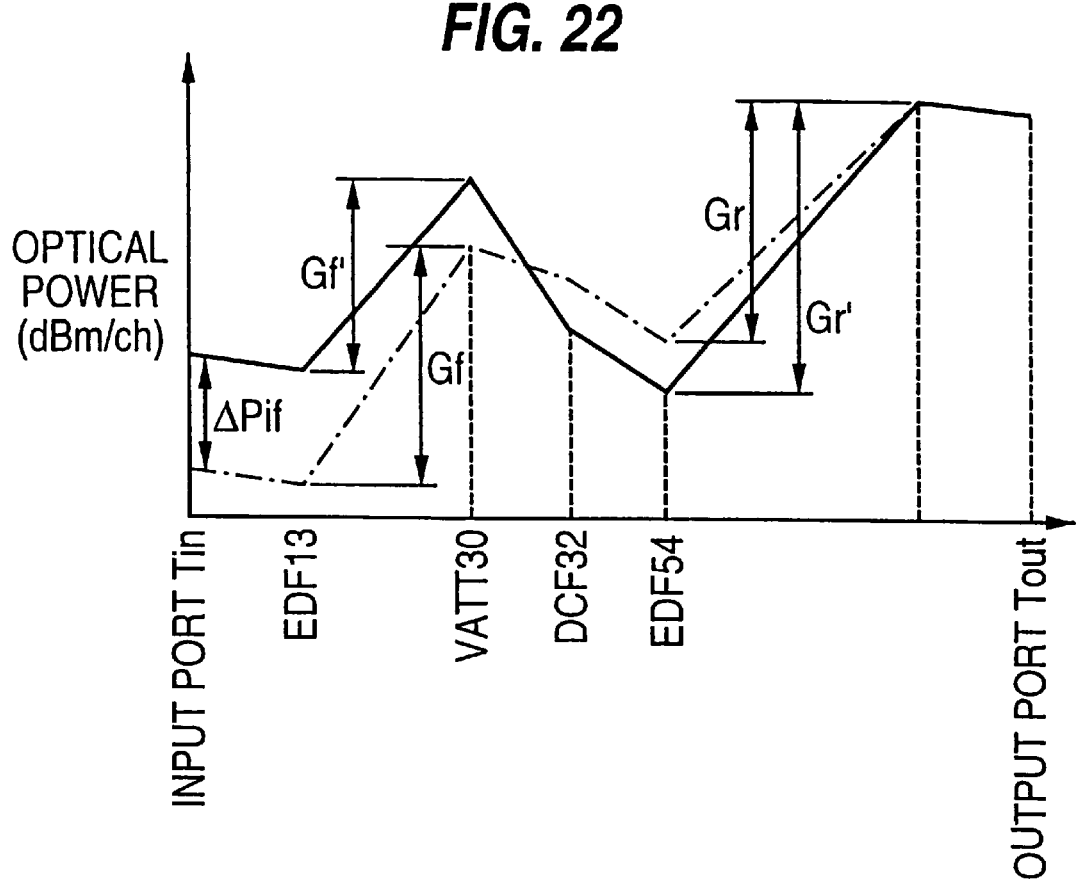
FIG. 22 is a graph illustrating changes in power level of WDM signal light per channel propagating in the optical amplification device in FIG. 21, according to an embodiment of the present invention.

FIG. 22 is a graph illustrating changes in power level of the WDM signal light per channel propagating in the optical amplification device in FIG. 21, according to an embodiment of the present invention. In FIG. 22, the changes in power level in the case of a low level of input light as shown by a long and short dashed line are similar to those shown in FIG. 19. That is, the low-level WDM signal light input to front-stage amplifier section 501 is amplified with a sufficiently high gain Gf set in consideration of decreasing a noise figure, and at this time the gain-wavelength characteristic of EDF 513 is effectively compensated by gain equalizer 515. In this case, the gain correction value Vadj output from subtracter 524 is zero because the AGC gain reference value Vagcref is predetermined according to the gain Gf. The WDM signal light supplied from front-stage amplifier section 501 to middle-stage ALC section 503 is attenuated to a given level according to the ALC reference value Valcref because the gain correction value Vadj is zero. Thereafter, the WDM signal light is supplied through dispersion compensating fiber 532 to rear-stage amplifier section 505. The WDM signal light input to rear-stage amplifier section 505 is amplified with the predetermined gain Gr, and at this time the gain-wavelength characteristic of EDF 554 is effectively compensated by gain equalizer 551. Thus, in the case that the level of input light is low, the noise figure of the optical amplifier as a whole can be reduced by setting the gain Gf of front-stage amplifier section 501 to a high value. Further, the gain-wavelength characteristics of EDFs 513 and 554 in front-stage and rear-stage amplifier sections 501 and 505 are effectively compensated by gain equalizers 515 and 551, respectively, because the pump light power is relatively low and the constant gain control can be maintained irrespective of a slight change in input light level. Therefore, the WDM signal light whose channels are equalized in level can be output from the optical amplifier.

In the case that the level of input light is high as shown by a solid line in FIG. 22, pumping source 518 cannot supply pump light having a high power enough to maintain the gain Gf constant, and the WDM signal light is amplified with a gain Gf' lower than the gain Gf. When the gain is reduced, the gain-wavelength characteristic of EDF 513 changes so as to have a positive tilt as shown in FIG. 20, so that the compensation of EDF 513 by gain equalizer 515 cannot be effectively performed.

To cope with this problem, such a change in the gain in front-stage amplifier section 501 is transmitted to middle-stage ALC section 503 and rear-stage amplifier section 505 to change the ALC reference value in middle-stage ALC section 503 and the set gain in rear-stage amplifier section 505, thereby compensating for the gain-wavelength characteristic of the optical amplifier as a whole. That is, the voltage value Vagc expressed as a logarithmic value of the gain Gf in front-stage amplifier section 501 is output from subtracter 523, and the voltage value Vagc is then subtracted from the AGC gain reference value Vagcref by subtracter 524. The difference obtained by subtracter 524 is then supplied as the gain correction value Vadj to both middle-stage ALC section 503 and rear-stage amplifier section 505.

In middle-stage ALC section 503, the ALC reference value Valcref is changed according to the gain correction value Vadj from front-stage amplifier section 501. For example, in the case that the gain in front-stage amplifier section 501 decreases by 1 dB, the gain correction value Vadj=1 is input to subtracter 537, and the difference obtained by subtracting the gain correction value Vadj from the ALC reference value Valcref, i.e., the difference of (Valcref−1) dB is supplied as a new ALC reference value Valcref' from subtracter 537 to ALC circuit 534. Then, the optical attenuation of variable optical attenuator 530 is controlled according to this new ALC reference value Valcref', so that the WDM signal light having a level lower by 1 dB than the level maintained under the constant gain control in front-stage amplifier section 501 is output from middle-stage ALC section 503 to rear-stage amplifier section 505.

In rear-stage amplifier section 505, the set gain in AGC is changed according to the gain correction value Vadj from front-stage amplifier section 501. In the above example, the gain correction value Vadj=1 from front-stage amplifier section 501 is input to adder 561, and added to the voltage value expressed as a logarithmic value supplied from log transformer 560. That is, the voltage value obtained by increasing the level of the WDM signal light to be supplied to EDF 554 by 1 is supplied from adder 561 to anti-log transformer 562. Then, the voltage value obtained as an anti-logarithmic value from anti-log transformer 562 is supplied to AGC circuit 559, thereby amplifying the WDM signal light with a gain Gr' higher by 1 dB than the gain Gr. When the gain is increased, the gain-wavelength characteristic of EDF 554 changes so as to have a negative tilt as shown in FIG. 20, so that the compensation of EDF 554 by gain equalizer 551 cannot be effectively performed. However, the uncompensated amount of the gain-wavelength characteristic in front-stage amplifier section 501 is canceled in rear-stage amplifier section 505, thereby allowing effective compensation for the gain-wavelength characteristic of the optical amplifier as a whole.

Figure 23:
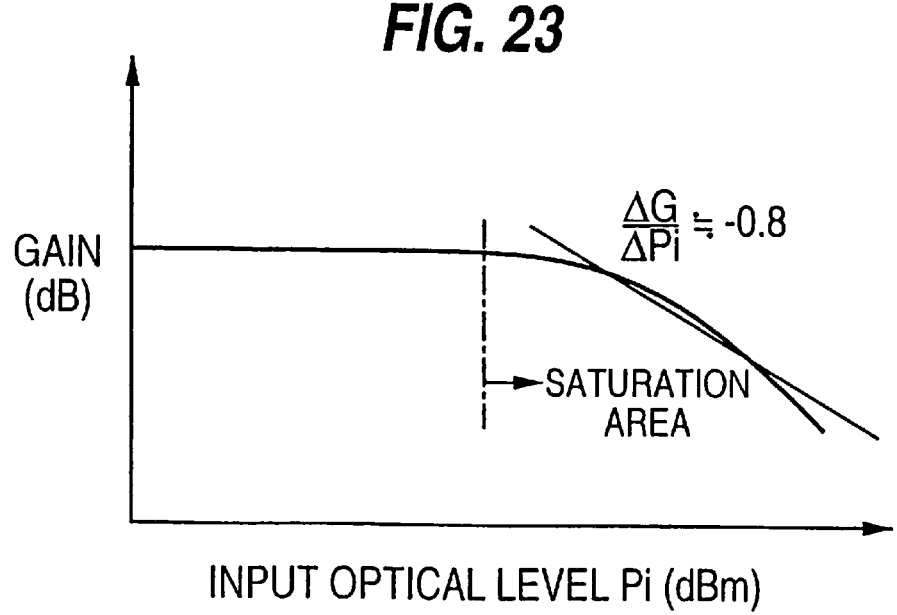
FIG. 23 is a graph illustrating a relation between input light level to an EDF and gain of the EDF in the optical amplification device in FIG. 21, according to an embodiment of the present invention.

At this time, an increase in pump light power required to increase the gain in rear-stage amplifier section 505 can be suppressed to a relatively small amount by operating EDF 554 in a saturated region. This is due to the fact that the relation of gain to input light level in an EDF generally has a negative tilt of about −0.8 in a saturated region as shown in FIG. 23 (e.g., when the input light level decreases by 1 dB, the gain increases by about 0.8 dB). Accordingly, an increase in pump light power required to increase the set gain can be suppressed.

As described above, in the case that the input light level is high, the gain Gf in front-stage amplifier section 501 is changed to the lower gain Gf' without restriction by AGC, thereby eliminating the need for use of a large-capacity light source as pumping source 518, and it is sufficient for pumping source 518 to supply pump light in its attainable range of output power to EDF 513. Even when the gain-wavelength characteristic of EDF 513 cannot be effectively compensated by gain equalizer 515 because of a change in gain in front-stage amplifier section 501, the gain-wavelength characteristics in front-stage and rear-stage amplifier sections 501 and 505 can be counterbalanced with each other by changing the ALC reference value in middle-stage ALC section 503 and the set gain in rear-stage amplifier section 505, thereby obtaining WDM signal light whose channels are equalized in level. Further, by operating rear-stage amplifier section 505 in a saturated region, an increase in pump light power in rear-stage amplifier section 505 can be minimized in spite of a decrease in gain in front-stage amplifier section 501. Regarding noise characteristics, there is little need for especially reducing a noise figure to ensure an S/N ratio at a receiving end, because the input light level is high. Accordingly, it can be said that it is almost unnecessary to maintain a high gain in front-stage amplifier section 501 and reduce a noise figure in comparison with the case that the input light level is low.

In FIG. 21, the gain-wavelength characteristic in front-stage amplifier section 501 and the gain-wavelength characteristic in rear-stage amplifier section 505 change with the same tendency in response to a change in the set gains. That is, the Er doped fiber amplifiers used in front-stage amplifier section 501 and rear-stage amplifier section 505 are similar in configuration to each other. However, the present invention is not limited to this configuration. For example, even in the case that the amounts of change in the gain-wavelength characteristics in the front-stage and rear-stage amplifier sections are different from each other in response to a change in the set gains, it is sufficient that the tendencies of change in the gain-wavelength characteristics in the front-stage and rear-stage amplifier sections are to be the same as each other, thereby exhibiting the effect of counterbalancing the gain-wavelength characteristics in the front-stage and rear-stage amplifier sections according to the above preferred embodiment. In this case, however, precise compensation for the gain-wavelength characteristic in the optical amplifier as a whole is not assured. Further, also in the case that the tendencies of change in the gain-wavelength characteristics in the front-stage and rear-stage amplifier sections are opposite to each other in response to a change in the set gains, a similar effect can be obtained by using a subtracter in place of the adder 561 in rear-stage amplifier section 505, for example.

While erbium doped fibers 513 and 554 are used in front-stage and rear-stage amplifier sections 501 and 505, the present invention is not limited to this configuration. For example, rare earth doped fibers containing any rare earth elements other than erbium may also be used in front-stage and rear-stage amplifier sections 501 and 505. Further, while the optical amplifier in FIG. 21 has a two-stage amplifying configuration, three or more-stage amplifying configuration may be adopted.

Figure 24:
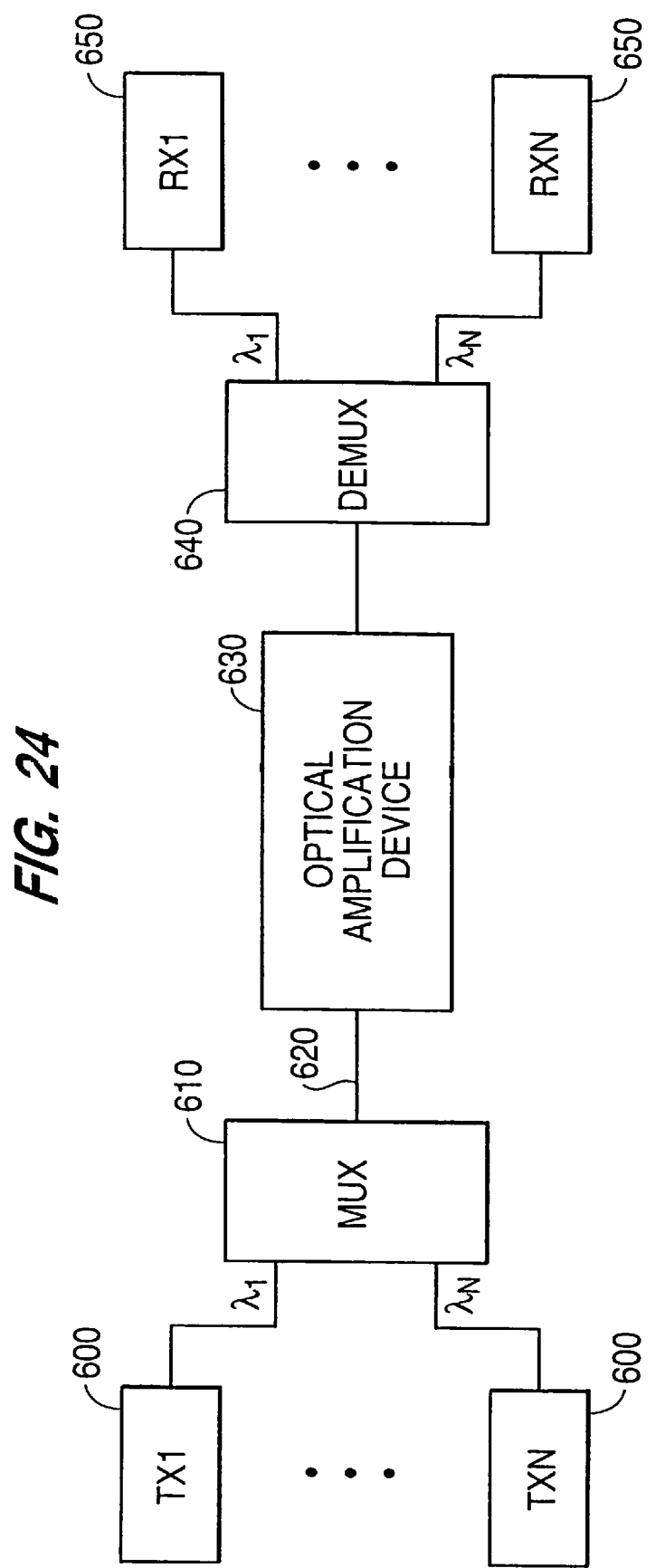
FIG. 24 is a diagram illustrating an optical communication system, according to an embodiment of the present invention.

FIG. 24 is a diagram illustrating an optical communication system according to embodiments of the present invention. Referring now to FIG. 24, optical transmitters (TX1 . . . TXN) 600 transmit optical signals at different wavelengths ($\lambda_1$ . . . $\lambda_N$), respectively. A multiplexer (MUX) 610 multiplexes the optical signals into a WDM signal light, and provides the WDM signal light to an optical fiber transmission line 620. An optical amplification device 630 amplifies the WDM signal light as the WDM signal light is travels through the transmission line 620. A demultiplexer (DEMUX) 640 demultiplexes the WDM signal light so that the individual optical signals can be received by receivers (RX1 . . . RXN) 650. Optical amplification device 630 can have a configuration as described herein for any of the embodiments of the present invention. For example, optical amplification device 630 can have a configuration as disclosed, for example, in either FIGS. 5, 7, 8, 9, 10, 12, 13, 15 or 21.

According to the above embodiments of the present invention, an optical amplification device (such as an optical amplifier) for WDM includes a gain deviation detecting device and a reference gain changing device. Accordingly, even in the case that the level of input light to the optical amplification device largely changes, the wavelength dependence of gain of each optical amplification stage can be reliably compensated without restriction by constant gain control. As a result, the optical amplification device can output WDM signal light whose channels are equalized in level. Further, there is no need for using a large-capacity pumping source to maintain the constant gain control, thereby attaining a cost reduction. Further, noise characteristics can be improved because the gain of the front-stage optical amplifying device can be set to a higher value. In addition, because a constant level control device and a reference level changing device are provided, it is possible to obtain WDM signal light whose optical signals in all the channels are amplified with a uniform gain and a constant level. Thus, it is possible to provide an optical amplifier for WDM having more stable amplification characteristics.

According to the above embodiments of the present invention, an optical amplification device (such as an optical amplifier) for wavelength division multiplexing includes a front-stage amplifier section 501 and a rear-stage amplifier section 505 each for amplifying WDM signal light having changing input level under constant gain control, and a middle-stage ALC section 503 for controlling the WDM signal light to a constant level. In front-stage amplifier section 501, a gain correction value Vadj indicative of a gain deviation is detected by log transformers 521 and 522 and subtracters 523 and 524. According to the gain correction value Vadj, an ALC reference value Valcref in middle-stage ALC section 502 and a reference gain in rear-stage amplifier section 505 are changed. Accordingly, a change in the gain-wavelength characteristic of front-stage amplifier section 501 is canceled by the gain-wavelength characteristic of rear-stage amplifier section 505, thereby effectively compensating for the gain-wavelength characteristic of the optical amplification device as a whole.

According to the above embodiments of the present invention, there is provided in an optical amplification device for WDM. A plurality of optical amplifying devices are cascaded together, each having a rare earth doped fiber for amplifying WDM signal light by receiving pump light. A plurality of constant gain control devices control the power of the pump light so that the gain of each optical amplifying device becomes a predetermined reference gain. A gain-wavelength characteristic compensating device compensates for the wavelength dependence of gain of each optical amplifying device at the reference gain. Moreover, a gain deviation detecting device detects a gain deviation between the gain of each optical amplifying device and the reference gain. A reference gain changing device changes the reference gain so that when the gain deviation of at least one of the plurality of optical amplifying devices is detected by the gain deviation detecting device, the reference gain of the other optical amplifying devices whose gain deviation is not detected is changed to cancel a change in the wavelength dependence of gain generated in the optical amplifying device whose gain deviation is detected.

With this configuration, the WDM signal light input to the optical amplification device is sequentially amplified by the plural cascaded optical amplifying devices. The pump light power in each optical amplifying device is controlled by the constant gain control device to thereby maintain the gain of each optical amplifying device constant in an attainable output range of the pump light. When the constant gain control for each optical amplifying device is maintained, the wavelength dependence of gain in each optical amplifying device is compensated by the gain-wavelength characteristic compensating device to thereby obtain WDM signal light whose channels are equalized in level. When the control by the constant gain control device in each optical amplifying device becomes out of the attainable output range of the pump light, the constant gain control for the optical amplifying device cannot be maintained to result in generation of a deviation between the gain of the optical amplifying device and its reference gain. As a result, the wavelength dependence of gain in the optical amplifying device changes to cause a problem that the compensation by the gain-wavelength characteristic compensating device does not effectively function. To cope with this problem, when this gain deviation is detected by the gain deviation detecting device, the reference gain of the other optical amplifying devices whose gain deviation is not detected is changed by the reference gain changing device according to the detected gain deviation. As a result, the change in the wavelength dependence of gain of the optical amplifying device whose constant gain control cannot be maintained is canceled by the wavelength dependence of gain of the other optical amplifying device whose reference gain has been changed, thereby obtaining WDM signal light whose channels are equalized in level.

Accordingly, even in the case that the level of input light to each optical amplifying device largely changes, the wavelength dependence of gain of each optical amplifying device can be reliably compensated without restriction by the constant gain control, thereby allowing output of WDM signal light having a flat gain-wavelength characteristic as the whole of the optical amplifier. Accordingly, the need for especially using a large-capacity pumping source can be eliminated to thereby reduce the costs of the optical amplifier for WDM. Further, the gain of the front-stage amplifying device can be set to a higher value, so that noise characteristics can also be improved.

Preferably, an optical amplification device according to embodiments of the present invention further comprises a level adjusting device, a constant level control device and a reference level changing device. The level adjusting device is provided on the front stage or rear stage of the plurality of optical amplifying devices or between the plurality of optical amplifying devices, for adjusting the level of the WDM signal light. The constant level control device controls an adjusting amount by the level adjusting device so that the power level of the WDM signal light per channel becomes a predetermined constant reference level. The reference level changing device changes the reference level so that when the gain deviation is detected by the gain deviation detecting device and the level adjusting device is provided on the rear stage of the optical amplifying device whose gain deviation is detected, the reference level is changed according to the gain deviation detected.

With this configuration, WDM signal light whose optical signals of all the channels are amplified with the same gain to a constant level can be obtained irrespective of whether or not the constant gain control is maintained for each optical amplifying device. Accordingly, it is possible to provide an optical amplifier for WDM which can be more stabilized in amplification characteristics.

Preferably, the gain deviation detecting device comprises a gain measuring device for measuring the gain of any one of the plurality of optical amplifying devices in which gain control by the constant gain control device cannot be maintained in a range of change in input light level, and gain deviation computing device for comparing the gain measured by the gain measuring device and the reference gain to obtain the gain deviation. The reference gain changing device is provided for any one of the plurality of optical amplifying devices in which the gain control by the constant gain control device can be maintained in the range of change in input light level.

According to the above embodiments of the present invention, the gain measuring device measures the gain according to the level of the WDM signal light input to the optical amplifying device and the level of the WDM signal light output from the optical amplifying device. As a modification, the gain measuring device may measure the gain according to the level of amplified spontaneous emission generated in the rare earth doped fiber of the optical amplifying device.

According to the above embodiments of the present invention, when the wavelength dependence of gain of the plurality of optical amplifying devices change with the same tendency in response to a change in gain, the reference gain of the other optical amplifying devices is increased with a decrease in gain in the optical amplifying device whose gain deviation is detected, whereas the reference gain of the other optical amplifying device is decreased with an increase in gain in the optical amplifying device whose gain deviation is detected.

Preferably, the gain deviation detecting device outputs a logarithmic value of the gain deviation, and the reference gain changing device changes the reference gain by using the logarithmic value of the gain deviation and the reference gain. More preferably, the reference level changing device changes the reference level by using the logarithmic value of the gain deviation and the reference level.

Therefore, according to the above embodiments of the present invention, an optical amplifier for use in a WDM optical communication system can ensure a required input dynamic range, can compensate for the gain-wavelength characteristic of each optical amplifying device within the optical amplifier without restriction by constant gain control, and can improve noise characteristics.

Various of the above embodiments of the present invention relate to an optical amplification device, such as an optical amplifier or an optical repeater, which has two optical amplifiers, or two optical amplification stages, cascaded together. However, the embodiments of the present invention are not intended to be limited to optical amplification devices having two stages. Instead, the present invention is applicable to apparatuses and methods in which more than two optical amplifiers, or optical amplification stages, are cascaded together. As an example, according to embodiments of the present invention as described above, an apparatus can include a plurality of optical amplifiers cascaded together so that a light is amplified by each optical amplifier as the light travels through the cascaded plurality of optical amplifiers. Each optical amplifier amplifies the light with a corresponding gain. A gain adjustor detects a deviation in gain of one of the plurality of optical amplifiers from a target gain, and adjusts the gain of at least one of the other of the plurality of optical amplifiers to compensate for the detected deviation. Here, the plurality of optical amplifiers cascaded together can include two or more optical amplifiers cascaded together.

Various wavelengths, frequencies and/or other numerical examples are provided herein to describe optical signals, pump lights, wavelength bands, etc. The present invention is not intended to be limited to these wavelengths, frequencies and/or other numerical examples.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:
1. An apparatus comprising:
a plurality of optical amplifiers optically connected together so that a wavelength division multiplexed (WDM) signal light is amplified by each of the optical amplifiers, each optical amplifier having a gain related to a ratio of a power level of the WDM signal light input to the respective optical amplifier to a power level of the WDM signal light output from the respective optical amplifier;
a variable attenuator optically connected between respective optical amplifiers of the plurality of optical amplifiers;
a controller detecting power levels of the WDM signal light input to, and output from, each optical amplifier of the plurality of optical amplifiers and, in accordance with all the detected power levels, controlling attenuation of the variable attenuator to thereby cause the sum of the gains of all the optical amplifiers of the plurality of optical amplifiers to be constant.

2. An apparatus comprising:
a first optical amplifier receiving a wavelength division multiplexed (WDM) signal light, amplifying the received WDM signal light with a gain of the first optical amplifier, and outputting the amplified WDM signal light, wherein a gain of the first optical amplifier is related to a ratio of a power level of the WDM signal light received by the first optical amplifier to a power level of the amplified WDM signal light output by the first optical amplifier;
a second optical amplifier receiving the amplified WDM signal light output by the first optical amplifier, further amplifying the received, amplified WDM signal light with a gain of the second optical amplifier, and outputting the further amplified WDM signal light, wherein a gain of the second optical amplifier is related to a ratio of a power level of the amplified WDM signal light received by the second optical amplifier to a power level of the further amplified WDM signal light output by the second optical amplifier;
a variable attenuator optically connected between the first and second optical amplifiers; and
a controller detecting a power level of the WDM signal light received by the first optical amplifier, a power level of the amplified WDM signal light output by the first optical amplifier, a power level of the amplified WDM signal light received by the second optical amplifier, and a power level of the further amplified WDM signal light output by the second optical amplifier and, in accordance with the detected power levels, controlling attenuation of the variable attenuator to thereby cause the sum of the gains of the first and second optical amplifiers to be constant.

3. An apparatus as in claim 2, further comprising:
a feedback loop maintaining constant a level of the WDM signal light output from at least one of the first and second optical amplifiers.

4. An apparatus comprising:
a first optical amplifier receiving a light and amplifying the received light with a gain of the first optical amplifier;
a second optical amplifier receiving the light amplified by the first optical amplifier, and amplifying the received light with a gain of the second optical amplifier;
a controller detecting a power level of the light received by the first optical amplifier, a power level of the light amplified by the first optical amplifier, a power level of the light received by the second optical amplifier, and a power level of the light amplified by the second optical amplifier and, in accordance with the detected power levels, causing the sum of the gains of the first and second optical amplifiers to be constant;
a first feedback loop maintaining a level of the light amplified by the first optical amplifier to be constant; and
a second feedback loop maintaining a level of the light amplified by the second optical amplifier to be constant.

5. An apparatus as in claim 4, wherein the controller comprises a variable attenuator optically connected between the first and second optical amplifiers, the controller controlling attenuation of the variable attenuator to cause the sum of the gains of the first and second optical amplifiers to be constant.

6. An apparatus comprising:
a first optical amplifier receiving a wavelength division multiplexed (WDM) signal light, amplifying the received WDM signal light with a gain of the first optical amplifier, and outputting the amplified WDM signal light, wherein a gain of the first optical amplifier is related to a ratio of a power level of the WDM signal light received by the first optical amplifier to a power level of the amplified WDM signal light output by the first optical amplifier;
a second optical amplifier receiving the amplified WDM signal light output by the first optical amplifier, further amplifying the received, amplified WDM signal light with a gain of the second optical amplifier, and outputting the further amplified WDM signal light, wherein a gain of the second optical amplifier is related to a ratio of a power level of the amplified WDM signal light received by the second optical amplifier to a power level of the further amplified WDM signal light output by the second optical amplifier;
a variable attenuator optically connected between the first and second optical amplifiers; and
a controller detecting a power level of the WDM signal light received by the first optical amplifier, a power level of the amplified WDM signal light output by the first optical amplifier, a power level of the amplified WDM signal light received by the second optical amplifier, and a power level of the further amplified WDM signal light output by the second optical amplifier and, in accordance with the detected power levels, controlling attenuation of the variable attenuator to cause the sum of the gains of the first and second optical amplifiers to be constant.

7. An apparatus as in 6, further comprising:
a feedback loop maintaining constant a level of the WDM signal light output from at least one of the first and second optical amplifiers.

8. An apparatus as in claim 6, further comprising:
a first feedback loop maintaining a level of the amplified WDM signal light output by the first optical amplifier to be constant; and
a second feedback loop maintaining a level of the further amplified WDM signal light output by the second optical amplifier to be constant.

9. An optical communication system comprising:
optical transmitters which transmit optical signals at different wavelengths;
a multiplexer multiplexing the optical signals into a wavelength division multiplexed (WDM) signal light;
an optical fiber transmission line through which the WDM signal light is transmitted; and
an optical amplification device amplifying the WDM signal light as the WDM signal light is transmitted through the transmission line, the optical amplification device including
a plurality optical amplifiers optically connected together so that the WDM signal light is amplified by each of the optical amplifiers, each of the optical amplifiers having a gain related to a ratio of a power level of the WDM signal light input to the respective optical amplifier to a power level of the WDM signal light output from the respective optical amplifier,
a variable attenuator optically connected between respective optical amplifiers of the plurality of optical amplifiers; and
a controller detecting power levels of the WDM signal light input to, and output from, each optical amplifier of the plurality of optical amplifiers and, in accordance with all the detected power levels, controlling attenuation of the variable attenuator to thereby cause the sum of the gains of all the optical amplifiers of the plurality of optical amplifiers to be constant.

10. A method comprising:
providing optical amplifiers optically connected together so that a wavelength division multiplexed (WDM) signal light is amplified by each of the optical amplifiers, each optical amplifier having a gain related to a ratio of a power level of the WDM signal light input to the respective optical amplifier to a power level of the WDM signal light output from the respective optical amplifier;
variably attenuating a power level of the WDM signal light between respective optical amplifiers of the provided optical amplifiers by an attenuation amount;
detecting power levels of light input to, and output from, each optical amplifier; and,
in accordance with the detected power levels, controlling the attenuation amount of said variably attenuating to thereby cause the sum of the gains of the optical amplifiers to be constant.

11. A method comprising:
a first amplification process of receiving a wavelength division multiplexed (WDM) signal light, optically amplifying the received WDM signal light with a gain of the first amplification process, and outputting the amplified WDM signal light, wherein the gain of the first amplification process is related to a ratio of a power level of the WDM signal light received by the first amplification process to a power level of the amplified WDM signal light output by the first amplification process;
a second amplification process of receiving the amplified WDM signal light output by the first amplification process, further optically amplifying the received, amplified WDM signal light with a gain of the second amplification process, and outputting the further amplified WDM signal light, wherein a gain of the second amplification process is related to a ratio of a power level of the amplified WDM signal light received by the second amplification process to a power level of the further amplified WDM signal light output by the second amplification process;
an attenuation process of attenuating the amplified WDM signal light output by the first amplification process before being received by the second amplification process by an attenuation amount;
detecting a power level of the WDM signal light received by the first amplification process, a power level of the amplified WDM signal light output by the first amplification process, a power level of amplified WDM signal light received by the second amplification process, and a power level of the further amplified WDM signal light output by the second amplification process; and, in accordance with the detected power levels, controlling the attenuation amount of the attenuation process to thereby cause the sum of the gains of the first and second amplification processes to be constant.

12. A method as in claim 11, further comprising:
maintaining constant a level of the WDM signal light output by at least one of the first and second amplification processes.

13. A method comprising:
a first amplification process of receiving a light and optically amplifying the received light with a gain of the first amplification process;
a second amplification process of receiving the light amplified by the first amplification process, and optically amplifying the received light with a gain of the second amplification process;
detecting a power level of the light received by the first amplification process, a power level of the light amplified by the first amplification process, a power level of light received by the second amplification process, and a power level of the light amplified by the second amplification process;
in accordance with the detected power levels, causing the sum of the gains of the first and second amplification processes to be constant;
maintaining a level of the light amplified by the first amplification process to be constant; and
maintaining a level of the light amplified by the second amplification process to be constant.

14. An apparatus comprising:
a first optical amplifier receiving a wavelength division multiplexed (WDM) signal light, amplifying the received WDM signal light, and outputting the amplified WDM signal light, wherein a gain of the first optical amplifier is related to a ratio of a power level of the WDM signal light received by the first optical amplifier to a power level of the amplified WDM signal light output by the first optical amplifier;
a second optical amplifier receiving the amplified WDM signal light output by the first optical amplifier, further amplifying the received WDM signal light and outputting the further amplified WDM signal light;
a variable attenuator optically attenuating the amplified WDM signal light output by the first optical amplifier before being received by the second optical amplifier by an attenuation amount; and
a controller detecting a power level of the WDM signal light received by the first optical amplifier, a power level of the amplified WDM signal light output by the first optical amplifier, a power level of the amplified WDM signal light received by the second optical amplifier, and a power level of the further amplified WDM signal light output by the second optical amplifier and, in accordance with the detected power levels, controlling a gain of the second amplifier by controlling the attenuation amount of the variable attenuator in accordance with a change in gain of the first optical amplifier.

15. An apparatus as in claim 14, wherein the apparatus is a multi-stage optical amplifier unit.

16. An apparatus as in claim 14, wherein
the first optical amplifier has a gain G1 and the second optical amplifier has a gain G2
the gain of the first optical amplifier is changed from G1 to G1',
the controller changes the gain of the second optical amplifier from G2 to G2' in response to the change in gain of the first optical amplifier from G1 to G1', and G1+G2=G1'+G2'.

17. An apparatus as in claim 15, wherein
the first optical amplifier has a gain G1 and the second optical amplifier has a gain G2,
the gain of the first optical amplifier is changed from G1 to G1',
the controller changes the gain of the second optical amplifier from G2 to G2', in response to the change in gain of the first optical amplifier from G1 to G1', and G1+G2=G1'+G2'.

18. An apparatus as in claim 14, wherein an output level of the second optical amplifier is maintained at a constant level, irrespective of the gains of the first and second optical amplifiers.

19. An apparatus as in claim 15, wherein an output level of the second optical amplifier is maintained at a constant level, irrespective of the gains of the first and second optical amplifiers.

20. An apparatus as in claim 16, wherein an output level of the second optical amplifier is maintained at a constant level, irrespective of the gains of the first and second optical amplifiers.

21. An apparatus as in claim 17, wherein an output level of the second optical amplifier is maintained at a constant level, irrespective of the gains of the first and second optical amplifiers.

22. An apparatus comprising:
a first optical amplifier receiving a wavelength division multiplexed (WDM) signal light, amplifying the received WDM signal light, and outputting the amplified WDM signal light, wherein a gain of the first optical amplifier is related to a ratio of a power level of the WDM signal light received by the first optical amplifier to a power level of the amplified WDM signal light output by the first optical amplifier;
a second optical amplifier receiving the amplified WDM signal light output by the first optical amplifier, further amplifying the received WDM signal light and outputting the further amplified WDM signal light;
a variable attenuator optically attenuating the amplified WDM signal light output by the first optical amplifier before being received by the second optical amplifier by an attenuation amount; and
means for detecting a power level of the WDM signal light received by the first optical amplifier, a power level of the amplified WDM signal light output by the first optical amplifier, a power level of the amplified WDM signal light received by the second optical amplifier and a power level of the further amplified WDM signal light output by the second optical amplifier and for, in accordance with the detected power levels, controlling a gain of the second amplifier by controlling the attenuation amount of the variable attenuator in accordance with a change in gain of the first optical amplifier.

23. An apparatus comprising:
a multistage optical amplifier unit including
a first optical amplifier receiving a wavelength division multiplexed (WDM) signal light, amplifying the received WDM signal light, and outputting the amplified WDM signal light, wherein a gain of the first optical amplifier is related to a ratio of a power level of the WDM signal light received by the first optical amplifier to a power level of the amplified WDM signal light output by the first optical amplifier;

a second optical amplifier receiving the amplified WDM signal light output by the first optical amplifier, further amplifying the received, amplified WDM signal light, and outputting the further amplified WDM signal light, a variable attenuator optically attenuating the amplified WDM signal light output by the first optical amplifier before being received by the second optical amplifier by an attenuation amount, and means for detecting a power level of the WDM signal light received by the first optical amplifier, a power level of the amplified WDM signal light output by the first optical amplifier, a power level of the amplified WDM signal light received by the second optical amplifier and a power level of the further amplified WDM signal light output by the second optical amplifier and for, in accordance with the detected power levels, controlling a gain of the second amplifier by controlling the attenuation amount of the variable attenuator in accordance with a change in gain of the first optical amplifier.

24. An apparatus comprising:

a first optical amplifier receiving a light and amplifying the received light with a gain of the first optical amplifier;

a second optical amplifier receiving the light amplified by the first optical amplifier, and amplifying the received light with a gain of the second optical amplifier;

a variable attenuator optically connected between the first and second optical amplifiers; and a controller detecting a power level of the light received by the first optical amplifier, a power level of the light amplified by the first optical amplifier, a power level of the light received by the second optical amplifier, and a power level of the light amplified by the second optical amplifier and, in accordance with the detected power levels, controlling attenuation of the variable attenuator to cause the sum of the gains of the first and second optical amplifiers to be constant;

a first feedback loop maintaining a level of the light amplified by the first optical amplifier to be constant; and a second feedback loop maintaining a level of the light amplified by the second optical amplifier to be constant.

25. An apparatus comprising:

optical amplifiers optically connected together so that a wavelength division multiplexed (WDM) signal light is amplified by each of the optical amplifiers in accordance with pump light of the respective optical amplifier;

a variable attenuator optically connected between respective optical amplifiers of the optical amplifiers;

a calculating unit calculating a gain of each of the optical amplifiers; and a controlling circuit controlling attenuation of the variable attenuator so that the sum of the calculated gains becomes constant.

26. An apparatus according to claim 25, further comprising:

a feedback loop maintaining constant a level of the WDM signal light output from at least one of the optical amplifiers by controlling attenuation of the variable attenuator.

27. An apparatus comprising:

a first optical amplifier receiving a wavelength division multiplexed (WDM) signal light, amplifying the received WDM signal light in accordance with pump light of the first optical amplifier and outputting the amplified WDM signal light;

a second optical amplifier receiving the amplified WDM signal light output by the first optical amplifier, further amplifying the received, amplified WDM signal light in accordance with pump light of the second optical amplifier, and outputting the further amplified WDM signal light;

a variable attenuator optically connected between the first and second optical amplifiers;

detectors detecting a power level of the WDM signal light received by the first optical amplifier, a power level of the amplified WDM signal light output by the first optical amplifier, a power level of the amplified WDM signal light received by the second optical amplifier, and a power level of the further amplified WDM signal light output by the second optical amplifier;

a calculating circuit calculating a gain of the first optical amplifier and a gain of the second optical amplifier by the detected power levels; and a controlling circuit controlling attenuation of the variable attenuator so that the sum of the calculated gains becomes constant.

28. An apparatus according to claim 27, further comprising:

a feedback loop maintaining constant at least one of a level of the amplified WDM signal light output by the first optical amplifier and a power level of the further amplified WDM signal light output by the second optical amplifier by controlling attenuation of the variable attenuator.

29. An optical communication system comprising:

optical transmitters which transmit optical signals at different wavelengths;

a multiplexer multiplexing the optical signals into a wavelength division multiplexed (WDM) signal light;

an optical fiber transmission line through which the WDM signal light is transmitted; and an optical amplification device amplifying the WDM signal as the WDM signal light is transmitted through the transmission line, the optical amplification device including optical amplifiers optically connected together so that the WDM signal light is amplified by each of the optical amplifiers in accordance with pump light of the respective optical amplifier, a variable optical attenuator connected between respective optical amplifiers of said optical amplifiers;

a calculating unit calculating a gain of each of the optical amplifiers, and a controlling circuit controlling attenuation of the variable attenuator so that the sum of the calculated gains becomes constant.

* * * * *

UNITED STATES PATENT AND TRADEMARK OFFICE
CERTIFICATE OF CORRECTION

PATENT NO. : 7,969,648 B2  Page 1 of 1
APPLICATION NO. : 11/406281
DATED : June 28, 2011
INVENTOR(S) : Shinya Inagaki et al.

It is certified that error appears in the above-identified patent and that said Letters Patent is hereby corrected as shown below:

Column 29, Line 47, In Claim 7, delete "as in" and insert -- as in claim --, therefor.
Column 31, Line 65, In Claim 16, after "G2" insert -- , --.
Column 32, Line 11, In Claim 17, delete "G2' ,in" and insert -- G2' in --, therefor.

Signed and Sealed this
Thirteenth Day of September, 2011

David J. Kappos
*Director of the United States Patent and Trademark Office*